Feb. 1, 1966     L. L. JOHNSON ETAL     3,232,529

VOTING MACHINES

Filed June 27, 1962                                                    17 Sheets-Sheet 1

INVENTORS
Leonard L. Johnson
Richard C. Wagner

ATTORNEYS

Feb. 1, 1966
L. L. JOHNSON ETAL
3,232,529
VOTING MACHINES
Filed June 27, 1962
17 Sheets-Sheet 2
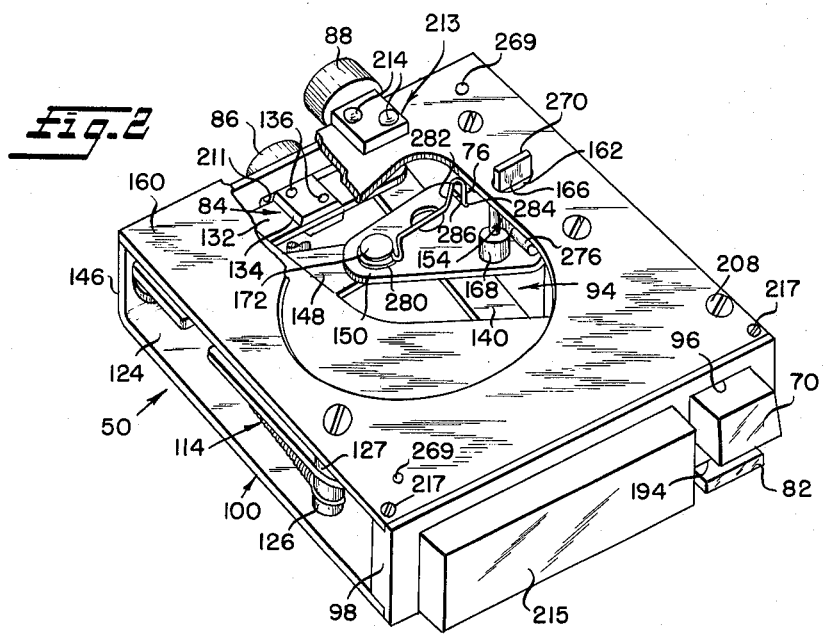
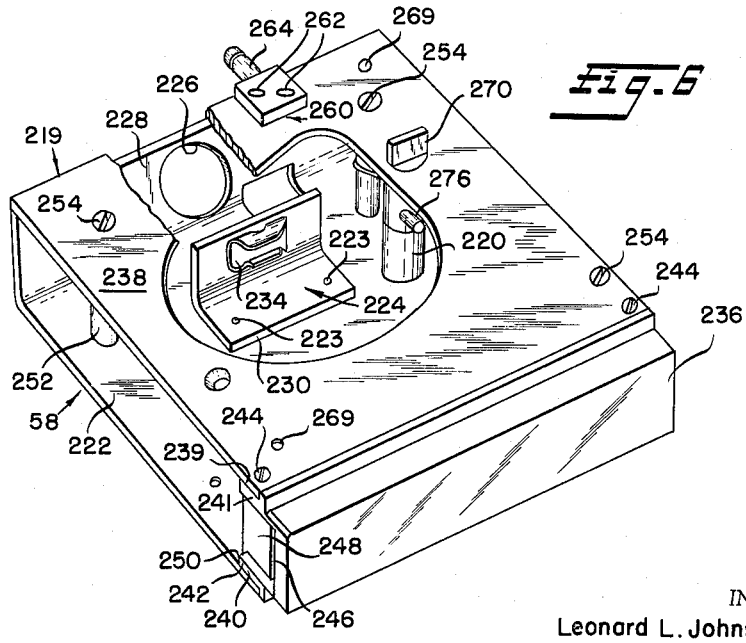
INVENTORS
Leonard L. Johnson
Richard C. Wagner
BY
ATTORNEYS

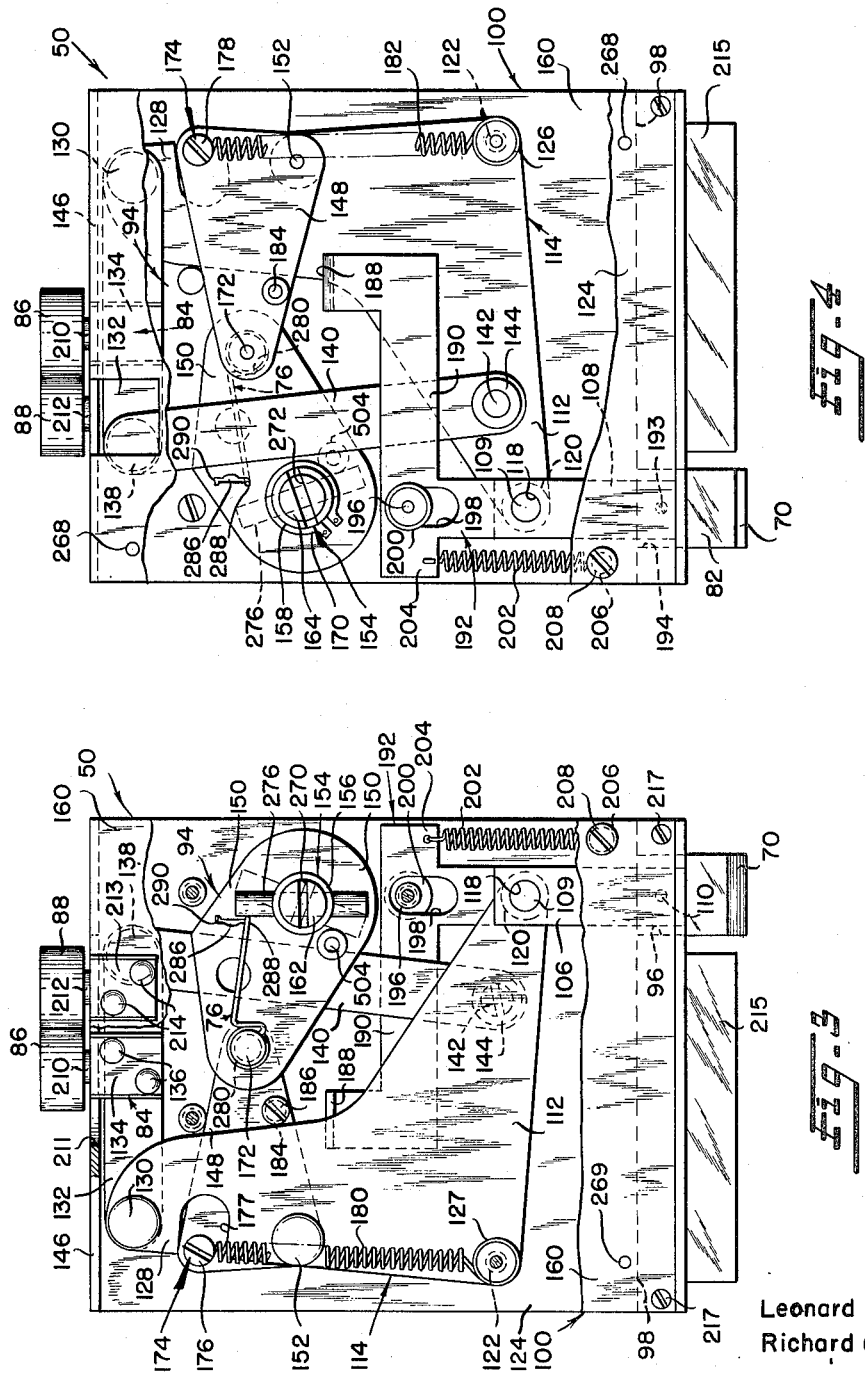

Feb. 1, 1966   L. L. JOHNSON ETAL   3,232,529
VOTING MACHINES
Filed June 27, 1962   17 Sheets-Sheet 4

INVENTORS
Leonard L. Johnson
Richard C. Wagner

BY
Strauch, Nolan & Neale
ATTORNEYS

Feb. 1, 1966 L. L. JOHNSON ETAL 3,232,529
VOTING MACHINES
Filed June 27, 1962 17 Sheets-Sheet 5
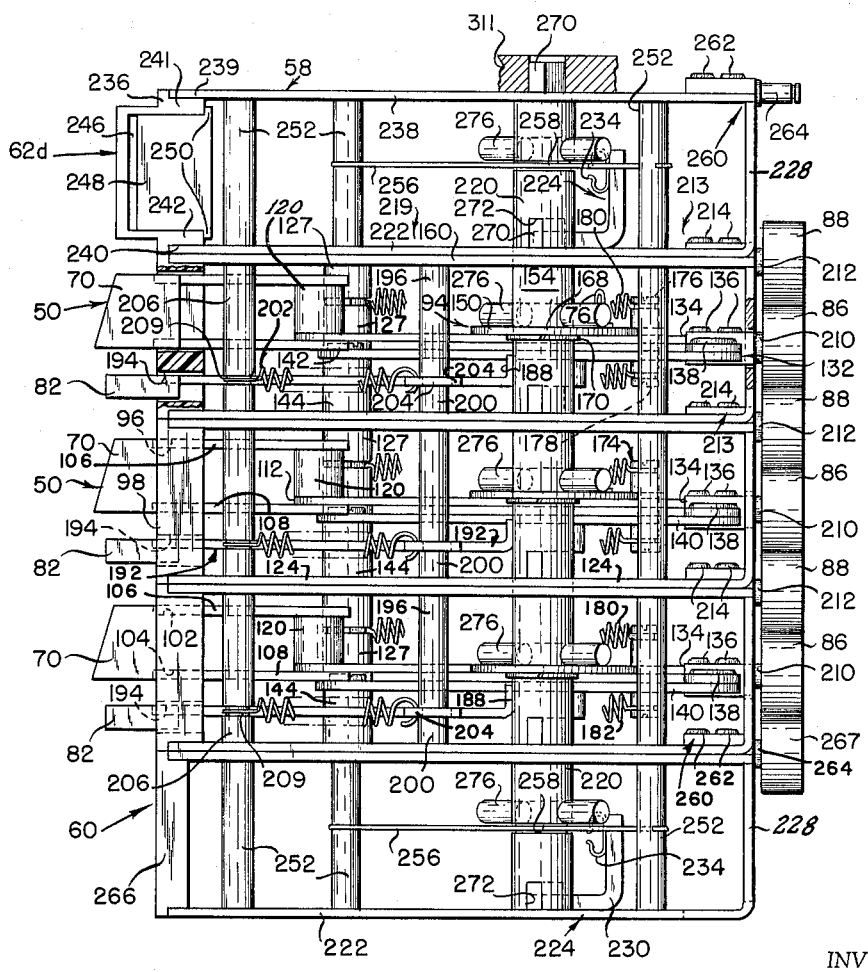
INVENTORS
Leonard L. Johnson
Richard C. Wagner
BY *Strauch, Nolan & Neale*
ATTORNEYS

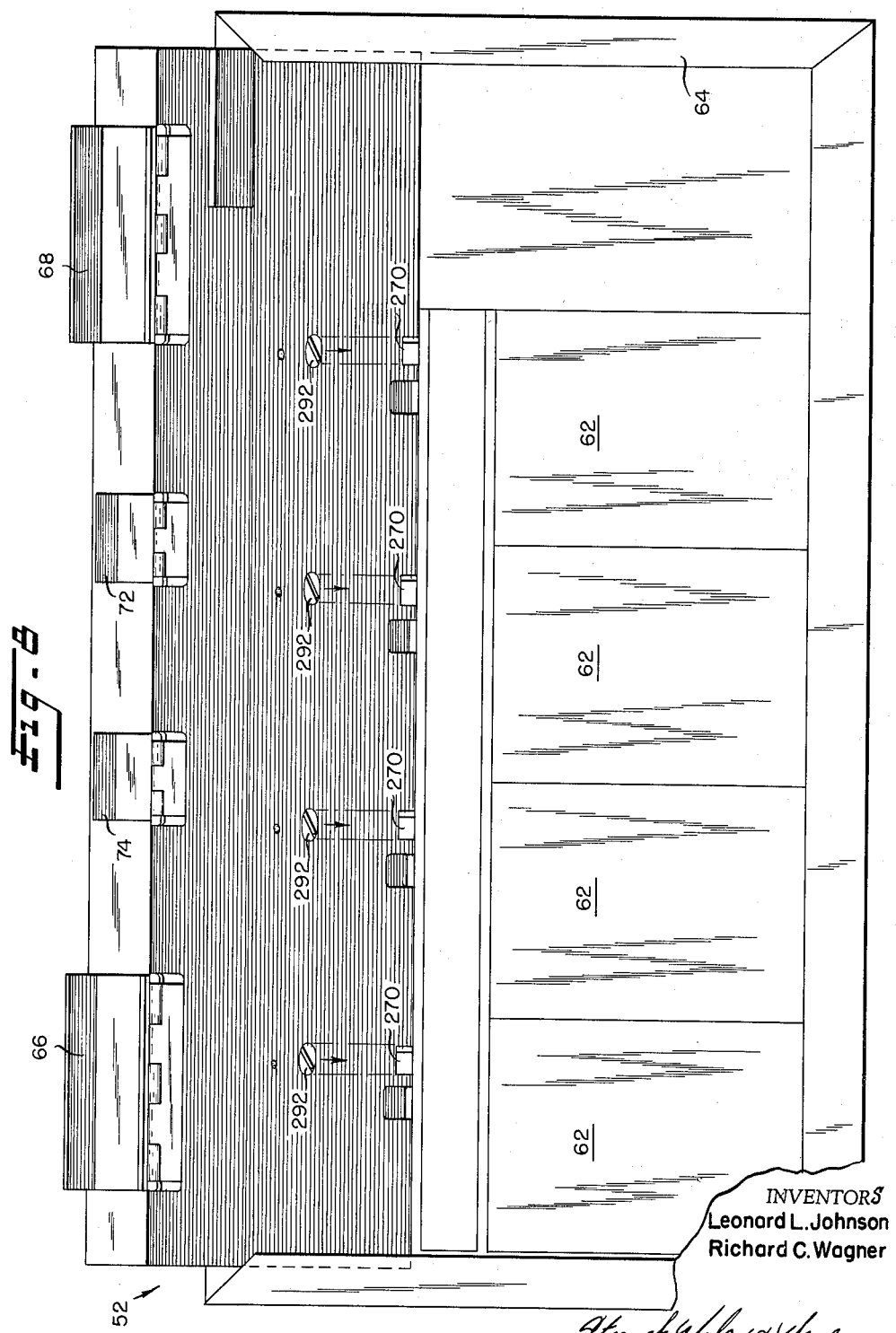

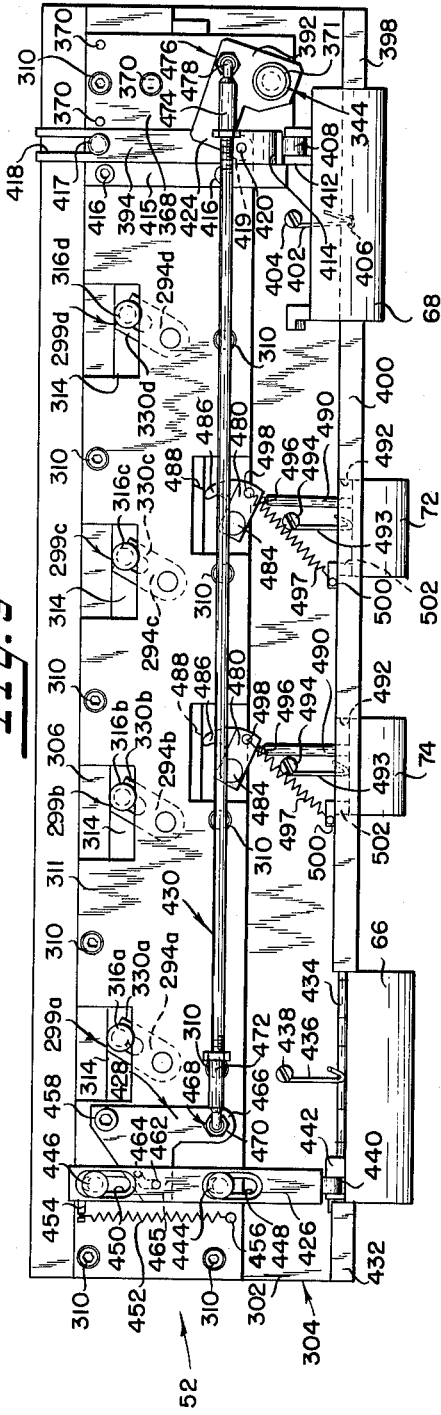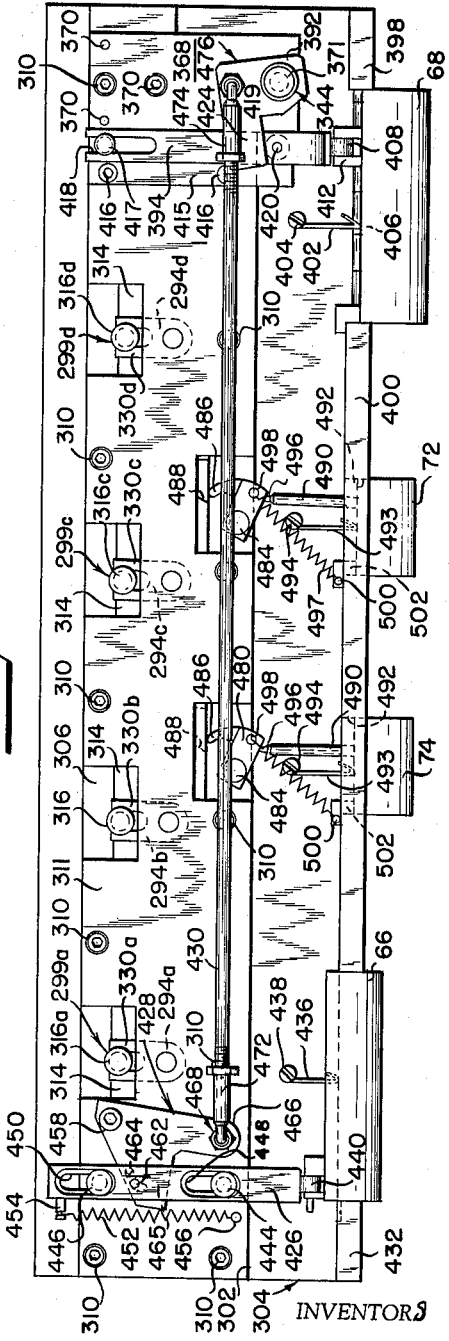

Feb. 1, 1966  L. L. JOHNSON ETAL  3,232,529
VOTING MACHINES
Filed June 27, 1962  17 Sheets-Sheet 8
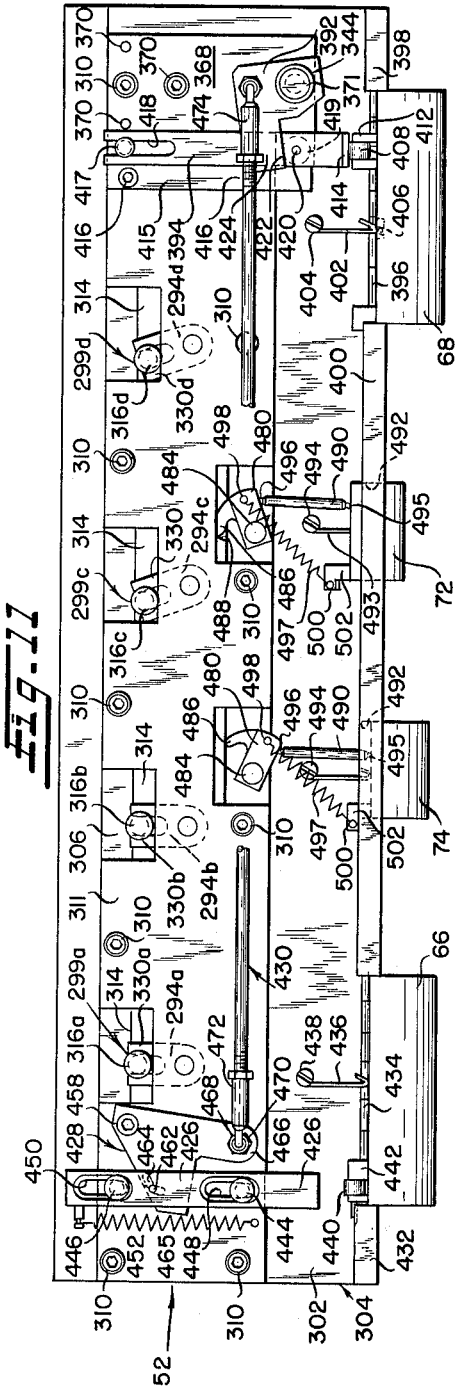
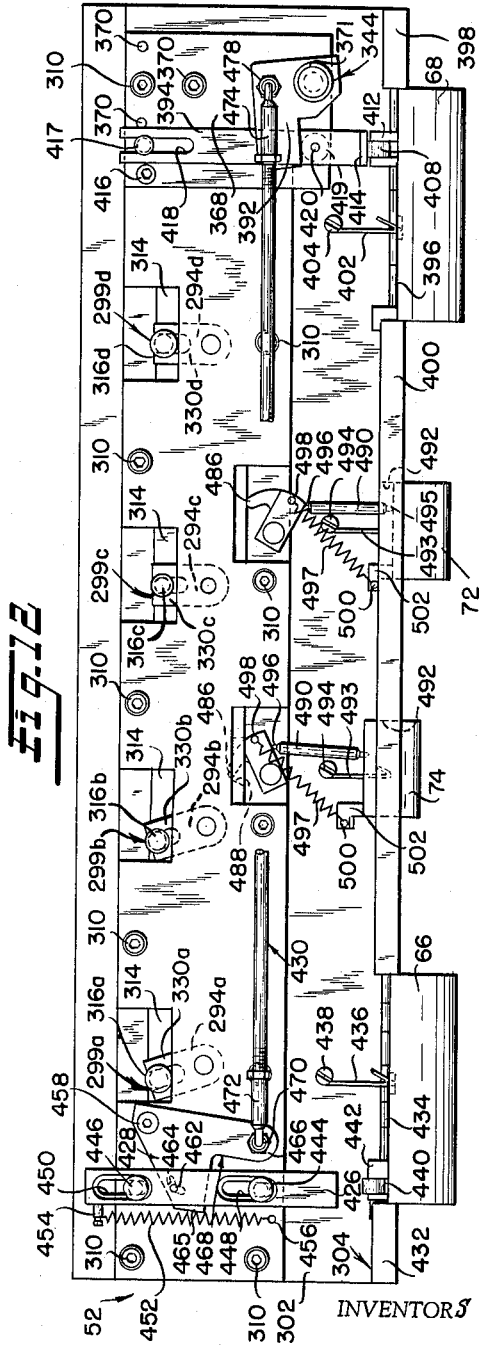
INVENTORS
Leonard L. Johnson
Richard C. Wagner
BY
*Strauch Nolan & Neale*
ATTORNEYS

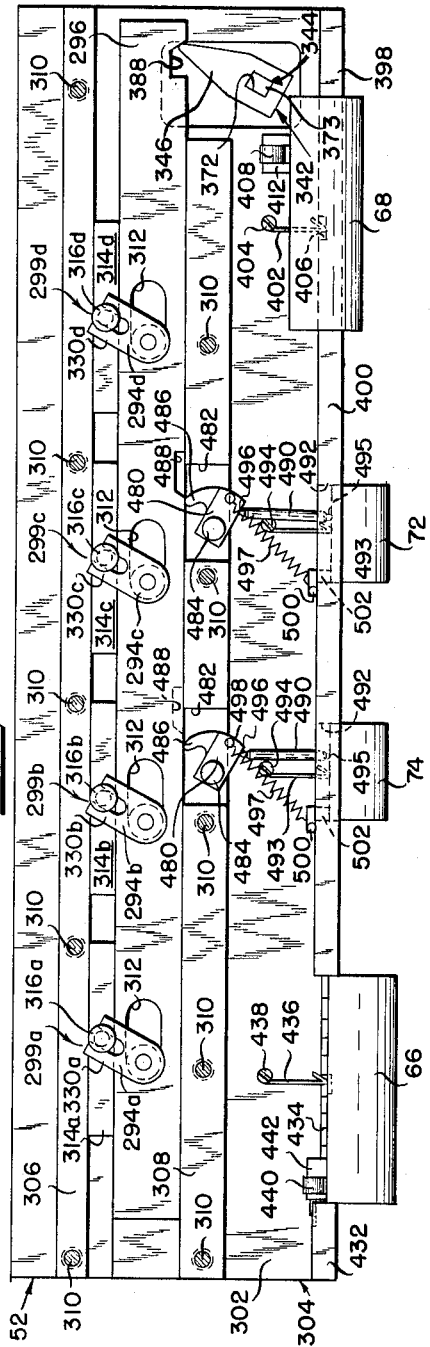
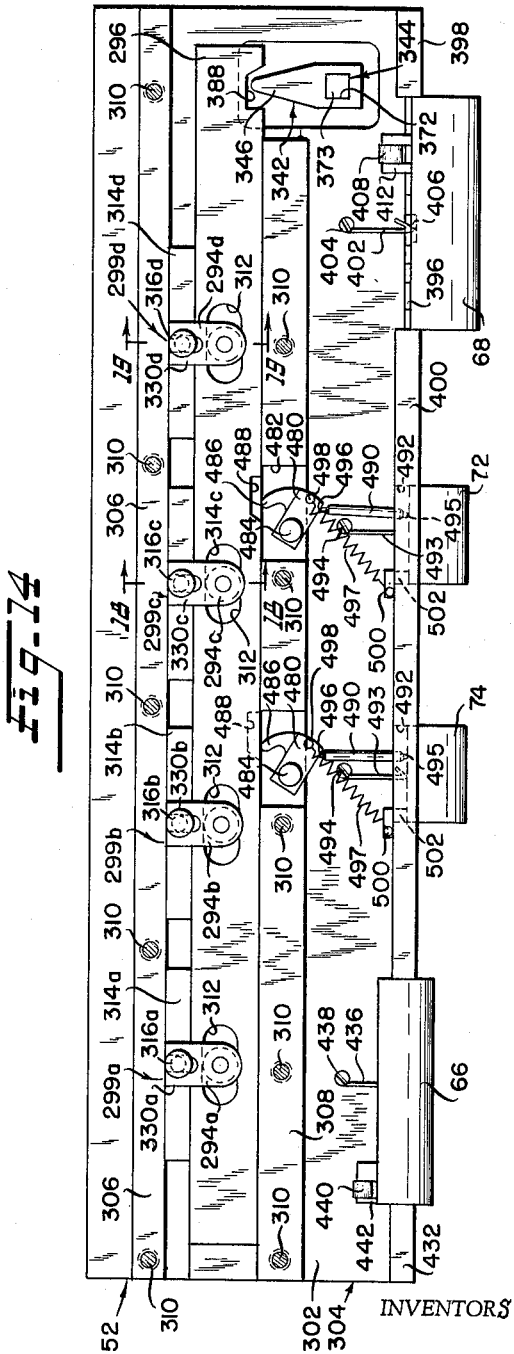

Feb. 1, 1966     L. L. JOHNSON ETAL     3,232,529
VOTING MACHINES
Filed June 27, 1962     17 Sheets-Sheet 10
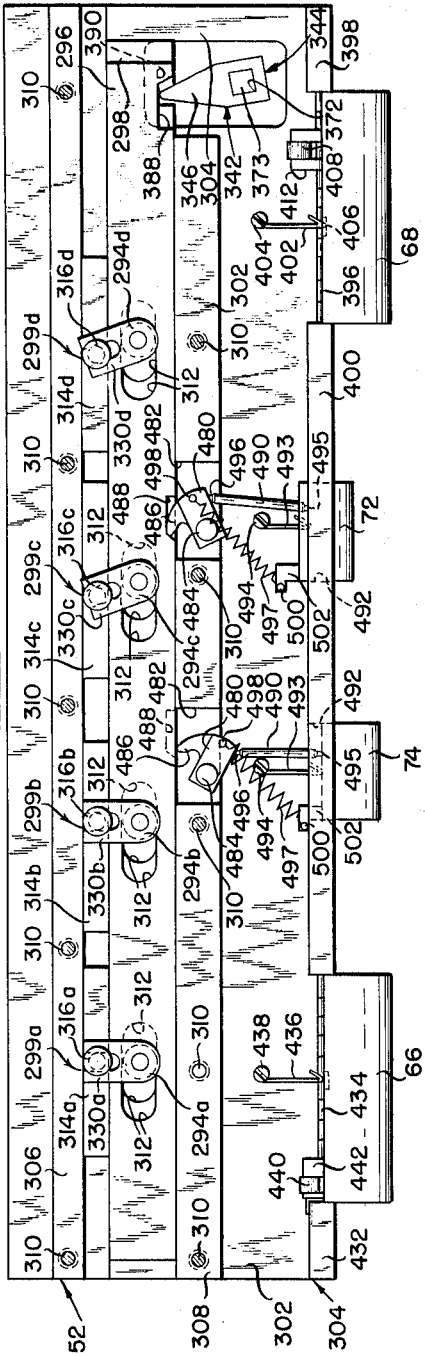
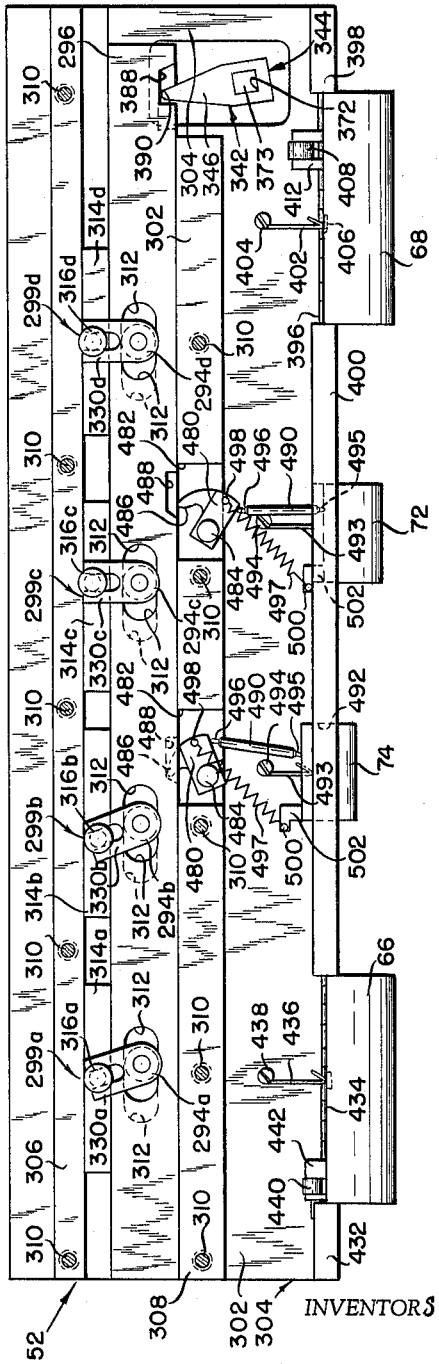
INVENTORS
Leonard L. Johnson
Richard C. Wagner
BY
*Strauch, Nolan & Neale*
ATTORNEYS INVENTORS
Leonard L. Johnson
Richard C. Wagner

ATTORNEYS

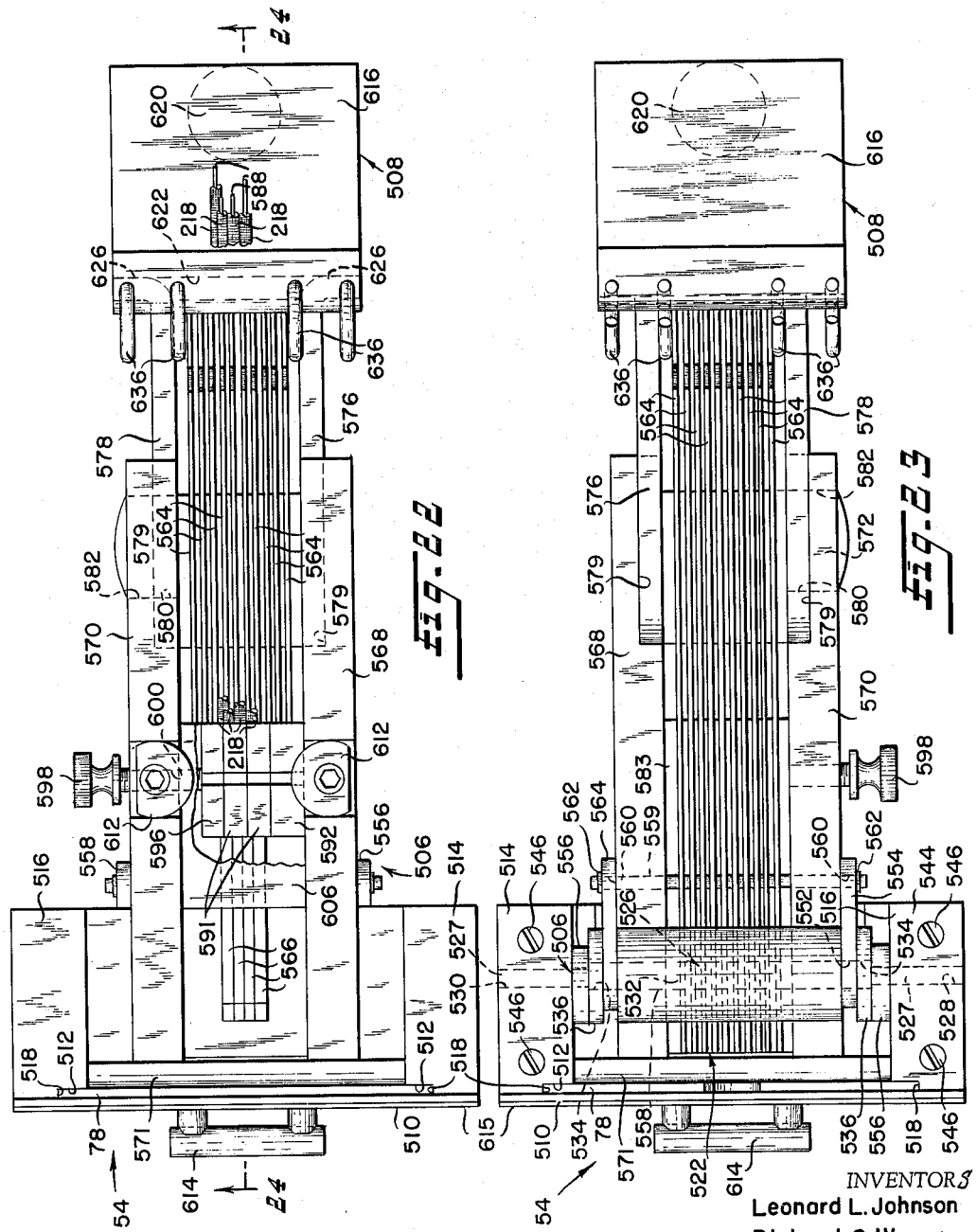

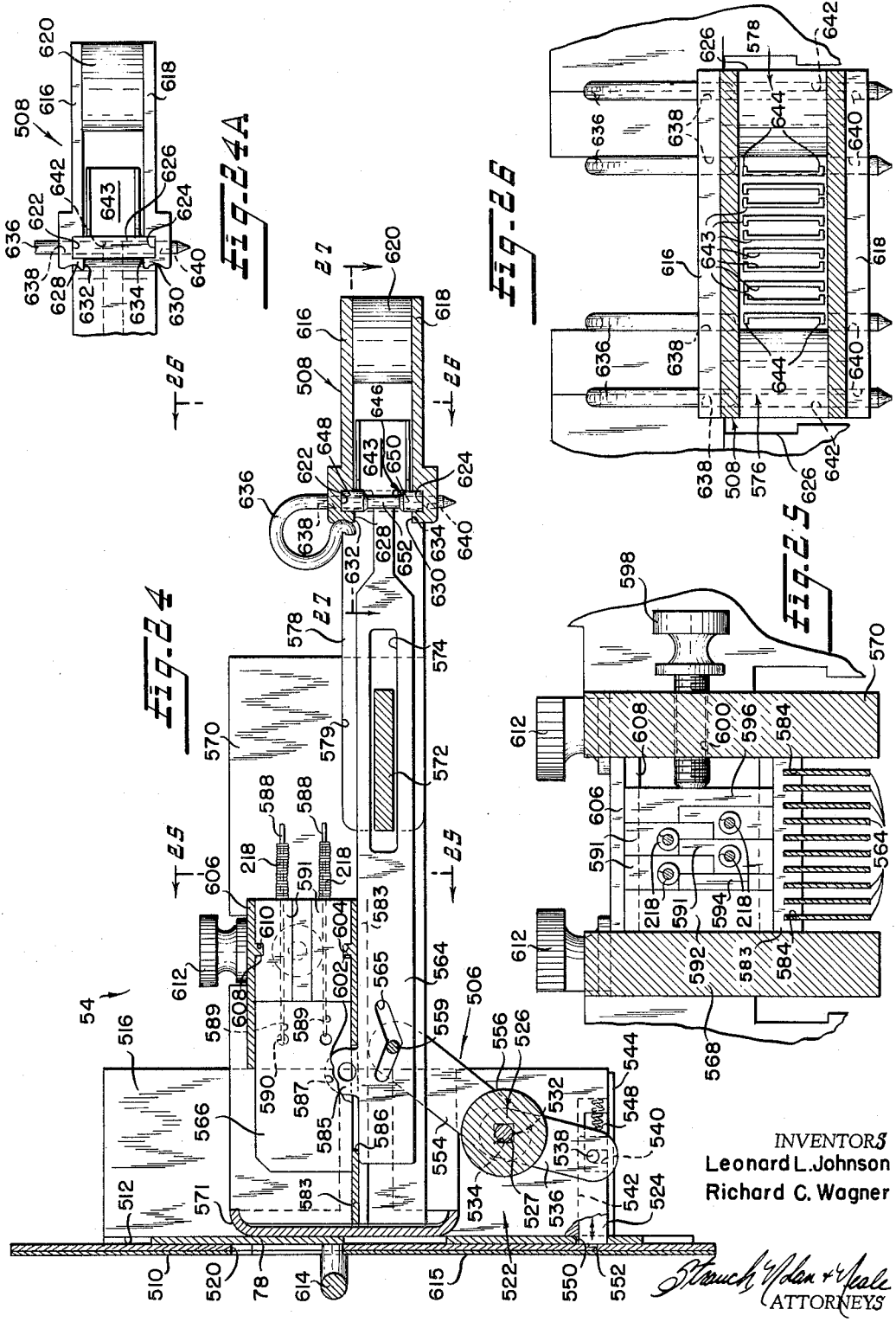

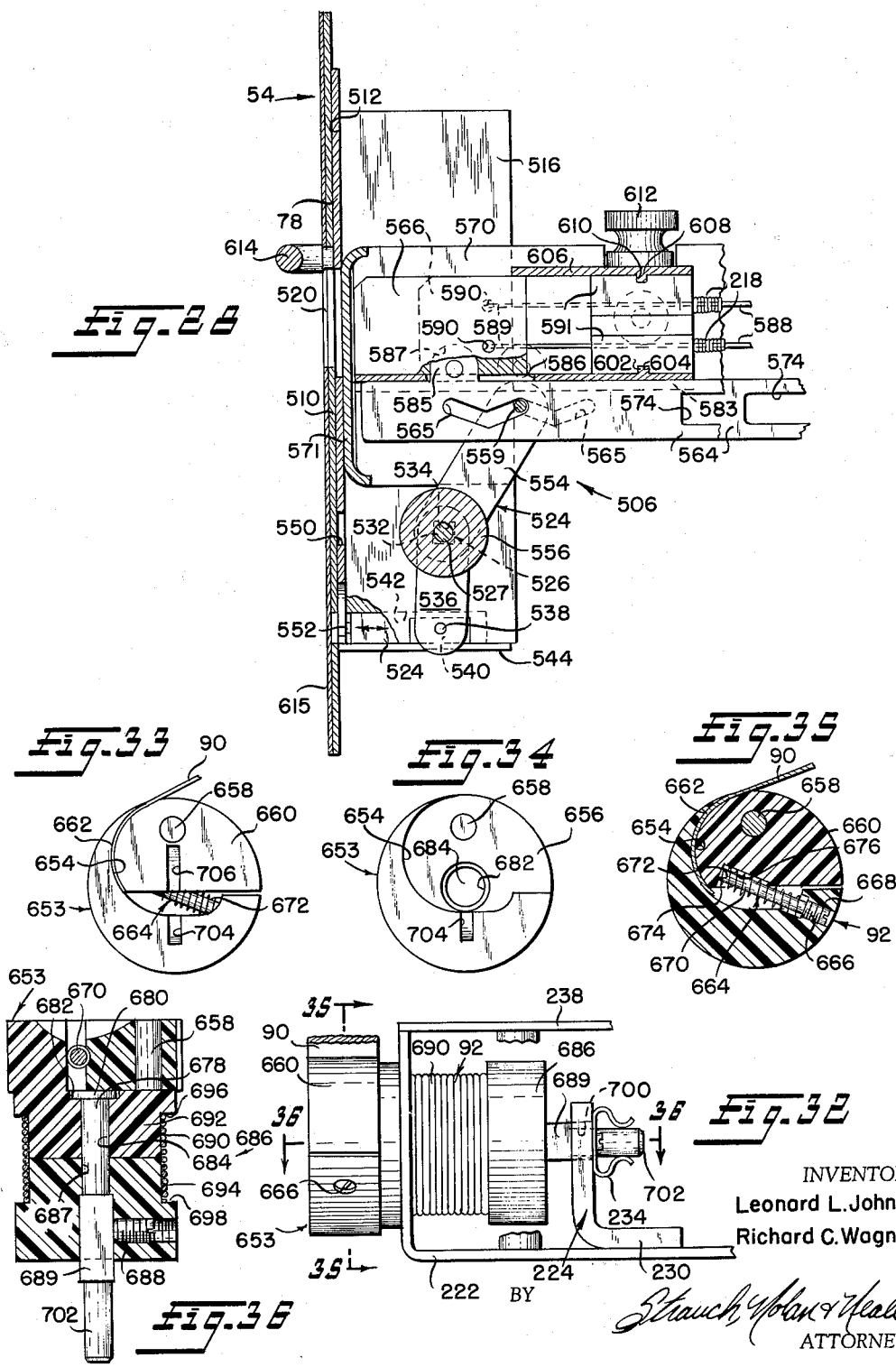

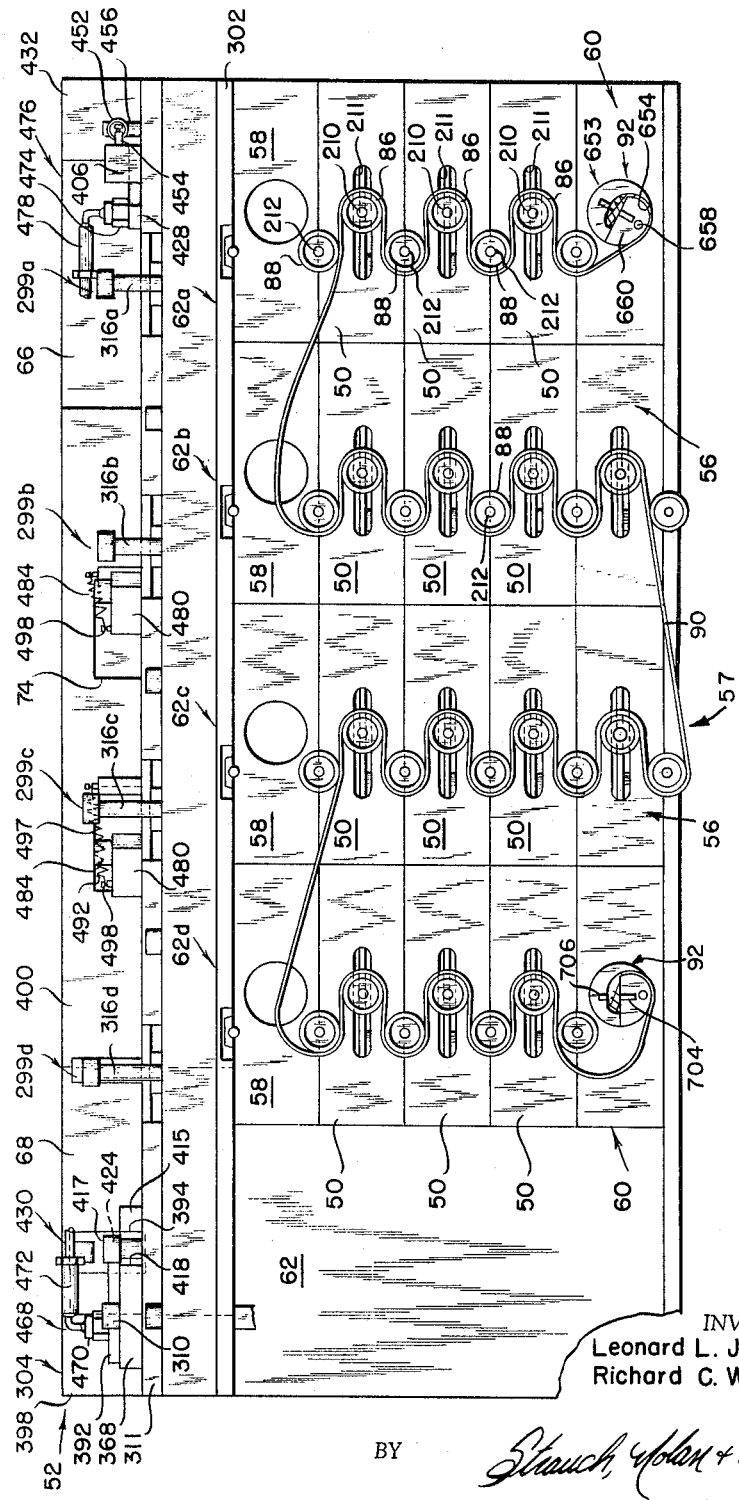

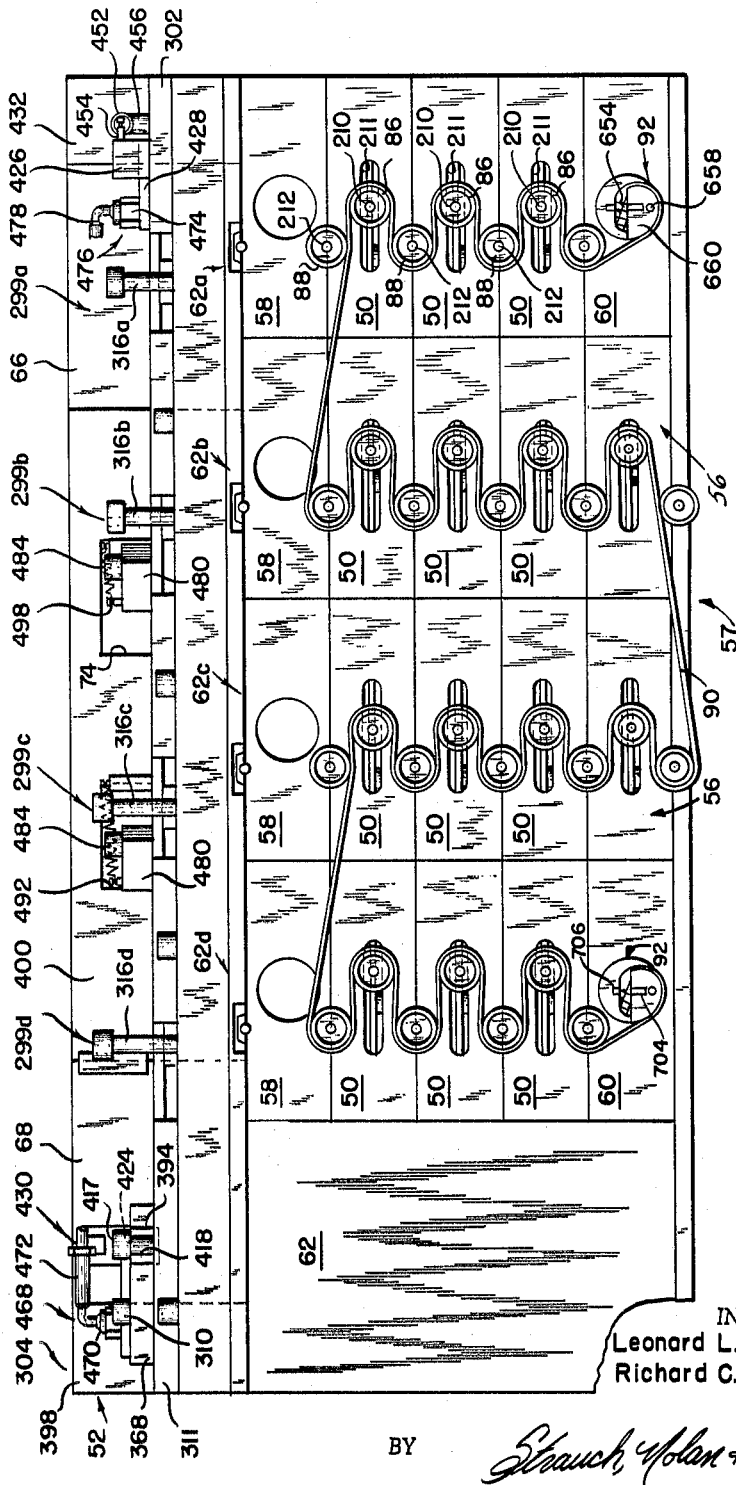

United States Patent Office 3,232,529
Patented Feb. 1, 1966

3,232,529
VOTING MACHINES
Leonard L. Johnson, Fort Wayne, Ind., and Richard C. Wagner, Clarendon Hills, Ill., assignors, by mesne assignments, to Automatic Voting Machine Corporation, Jamestown, N.Y., a corporation of Delaware
Filed June 27, 1962, Ser. No. 205,722
30 Claims. (Cl. 235—54)

This invention relates to voting machines and, more specifically, to voting machines of the automatic tape.

It is the primary object of this invention to provide automatic voting machines which are simpler and less expensive to manufacture than those of the prior art.

The foregoing object is accomplished in main part by a novel modular construction and a novel flexible ribbon interlock which limits the number of candidates for which a voter may cast his ballot together with a novel write-in unit and a novel machine control unit for party voting and for setting and clearing the voting machine. The voting machine provided by the present invention includes, in addition to the components specifically mentioned above, a voting module for each candidate, an office-head module, one or more write-in modules for each office to be filled, and, in some instances, one or more blank modules.

The voting modules, which are all identical, each have a "vote" button which, when depressed by the voter, moves an output member from an unvoted position to a voted position. When the voting machine is subsequently cleared, the output members are restored to the unvoted position and the votes are registered. Each voting module also includes a cancel button which may be depressed to restore the output member to the unvoted position to rescind a vote.

The voting modules are assembled in columns in which they are interlocked so that all modules in the column may be voted simultaneously as contrasted with the individual operation described above. This mode of operation is employed for party voting in which a single lever may be actuated to vote for the entire slate of candidates presented by a particular party. For party voting the present invention also provides a novel control unit which combines a control for unlocking or setting the machine, a voting lever for each party, and a control for clearing the machine and restoring it to a locked condition from which it may be reset.

In some circumstances the number of candidates for a particular office on each slate will require a greater number of modules than can be accommodated in a single column. To provide for this contingency, the voting machine of the present invention includes a number of columns and an equal number of party selection pins which are incorporated in the machine control unit. These pins may be positioned by the election officials to couple one or several columns to each of the party levers.

In programming the voting machine, candidates for each office to be filled are assigned voting modules within one or more columns, depending on the number of candidates and the number of modules in the column. In order to identify the office, office head modules are assembled on the upper end of each column. The office head modules carry identifying labels and also provide mechanical connections between the voting and write-in modules in the columns and the party levers to which the columns are coupled.

Often an independent candidate will vie for a particular office against the party candidates. To accommodate such candidates the voting modules are provided with party latches which permit an independent candidate's voting module to be assembled in a column with the modules of party candidates for the same office, but which, in effect, disconnects the independent candidate's module from the party lever so that such candidates must be independently voted for as described above.

Similarly, voters may wish to vote for persons who have not been formally nominated and whose names do not appear on a voting module. To accommodate such voters, the voting machine of the present invention provides a write-in voting unit and one or more write-in modules for operating this unit. The write-in unit includes a normally locked ballot access door which may be unlocked to expose a ballot on which the desired candidate's name may be written. The write-in modules are provided to unlock the ballot access door and are similar to the voting modules described except that their output members are connected to a door latching mechanism in the write-in unit instead of a counter.

The write-in voting unit described above is preferably equipped with a paper supply and transport system actuated concurrently with the write-in unit door unlocking mechanism by the write-in module to advance the paper and expose a new ballot. In order to prevent voters from inadvertently operating two write-in modules in succession and thereby losing an opportunity to "write in" a candidate's name, the write-in unit is equipped with a novel interlock which prevents simultaneous inputs to the write-in unit from a plurality of modules.

One of the most important requisites of an automatic voting machine is a fool-proof mechanism for limiting the number of votes cast for a given office by each voter. For example, if the voter is to be allowed to select six of a larger number of candidates for a give office as in an at-large election of members to the house of Representatives, the voting machine must prevent the voter from casing a ballot for more than six nominees. One of the salient features of the present invention is a novel flexible ribbon interlock provided for this purpose. One ribbon interlock heretofore proposed for voting machine application is disclosed in United States Patent 846,104 issued to W. M. Delavan on March 5, 1907, for "Multi-Indorsement Restricting Device for Voting Machines." The ribbon device of the Delavan patent, however, was employed for a different purpose then and is not suited for use in the voting machine of the present invention without extensive modification.

A portion of this interlock is provided by the voting and write-in modules which, insofar as they provide components of the interlock, are identical. Each of these modules includes a pair of rollers, one fixed to the module housing and the other carried on the module output member. Threaded over the rollers of the assembled modules is a flexible metallic ribbon fastened, at each end, to a ribbon supply spool. When the machine is in the cleared configuration, the interlock ribbon has a predetermined amount of slack which will vary with the number of nominees to be elected to a particular office. Subsequent depression of the voting button of a selected module by the voter will displace that module's output member in a direction reducing this slack by a predetermined increment such that, when the maximum allowable number of candidates has been selected, the ribbon will be taut, preventing the voter from depressing a further vote button to cast another vote.

As was mentioned above, each module is provided with a cancel button. By depressing this button, the voter may return the output member to its unvoted position, restoring an increment of slack to the ribbon and permitting the voter to select another candidate for the office.

The ribbon supply spools are removably fixed in cooperating supply spool locks which are incorporated in the blank and office head modules described above and preferably include one-way clutches to facilitate precise adjustment of the interlock ribbon tension.

When the voter has settled on the candidates for whom he wishes to vote, he operates a lever to clear the machine, preferably concurrently opening the curtain of a voting booth. The clearing action restores the output members of the voted modules to the non-voted position and simultaneously registers a vote for each of the selected candidates. The vote registering mechanism forms no part of the present invention and may be of any desired construction. One suitable form is disclosed in United States Patent 2,471,567 issued to A. N. Gustavson for "Voting Machine."

In its cleared configuration, the voting machine is locked, preventing persons from inadvertently or deliberately casting ballots to which they are not entitled. A subsequent voter, upon being properly identified, however, may operate a second lever to unlock the machine so that he may cast his ballot. At the same time, the machine unlocking lever preferably actuates a mechanism to close a voting booth curtain. The particular curtain operating mechanism operated by the machine clearing and unlocking levers likewise forms no part of the present invention. One form of mechanism which may readily be adapted for use in the voting machine provided by the present invention is shown in United States Patent 2,284,144 issued May 26, 1942 to A. N. Gustavson for "Voting Machine."

Other objects of the present invention, which may be realized from the novel features briefly described above, include:

(1) The provision of voting machines having a modular construction facilitating assembly and disassembly of the machine;

(2) The provision of voting machines with simplified and reliable interlocks for limiting the number of candidates a voter may nominate for a particular office;

(3) The provision of voting machines having novel control units with voter-operated levers for party voting and for clearing and setting the machines;

(4) In conjunction with the foregoing object, the provision of voting machines having a columnar array of voting modules and party program devices for operatively coupling one or more selected columns to each party lever;

(5) In conjunction with the next preceding object, the provision of voting modules having latches for operatively disconnecting any, some, or all of the voting modules in any column from the party levers without affecting the connection to the remainder of the modules in the column;

(6) The provision of novel voting modules for voting machines of modular construction including locking mechanisms for preventing unintentional vote cancellation and cancel buttons permitting deliberate cancellations;

(7) The provision in voting machines of modular construction of novel write-in voting units operated by write-in modules;

(8) In conjunction with the preceding object, the provision in the write-in units of novel interlocks preventing simultaneous actuation of a plurality of write-in modules; and (9) In voting machines of modular construction, the provision of columnar arrays of voting modules with the modules in each column being for candidates to the same office and novel office head modules superimposable on each column to identify the office.

Other objects and further novel features of the present invention will become fully apparent from the appended claims and from the ensuing detailed description and discussion taken together with the attached drawings in which:

FIGURE 2 is a perspective view of a voting module employed in the voting machine of FIGURE 1;

FIGURE 3 is a top view of the module of FIGURE 2 in the unvoted configuration with a portion of the top of the module housing broken away to more clearly show the operating mechanism;

FIGURE 4 is a bottom view of the voting module in the unvoted configuration with a portion of the bottom of the housing broken away to show the operating mechanism;

FIGURE 6 is a perspective view of an office head module employed in the voting machine of FIGURE 1;

FIGURE 7 is an end view of a columnar assembly or array of voting modules together with an office head module and a blank module viewed substantially in the direction indicated by arrows 7—7 in FIGURE 1;

FIGURE 8 is a generally diagrammatic front view of the voting machine of FIGURE 1 with the machine control unit tipped up from its normal position to show its bottom surface and the mechanical connections between it and the columns of modules;

FIGURE 9 is a top plan view of the machine control unit as it appears after the voting machine has been cleared and locked and the vote registered by depression of the "curtain open" lever;

FIGURE 10 is a view similar to FIGURE 9 illustrating the configuration of the machine control unit after the "curtain close" lever has been depressed to unlock the machine and set it for voting;

FIGURE 11 is a view similar to FIGURE 10 illustrating the configuration of the machine control unit after one of the party levers has been depressed to register a straight party vote;

FIGURE 12 is a view similar to FIGURE 11 but illustrating the configuration of the machine control unit after depression of the other party lever;

FIGURES 13–16 are views similar to FIGURES 9–12, respectively, but with certain components of the machine control unit removed to illustrate the major control elements of the unit;

FIGURE 22 is a top view of the write-in voting unit employed in the automatic voting machine of FIGURE 1 with the write-in ballot access door locked in its normal closed position;

FIGURE 23 is a bottom view of the voting unit in the same configuration as in FIGURE 22;

FIGURE 24 is a sectional view of the voting unit taken substantially along line 24—24 of FIGURE 22 and illustrates the details of the door locking mechanism and the input members provided for operating this mechanism together with the interlock straps and rollers and the interlock channel;

FIGURE 24a is a side view of the write-in unit channel interlock;

FIGURE 25 is a sectional view, taken substantially along line 25—25 of FIGURE 24, of the write-in unit input members;

FIGURE 26 is a sectional view, taken substantially along line 26—26 of FIGURE 24, of the locking straps and interlock channel;

FIGURE 28 is a view similar to FIGURE 24 but with one of the input members actuated to unlock the ballot access door;

FIGURE 30 is a rear view of the voting machine of FIGURE 1 with the housing removed and with the interlock ribbon as it appears with the voting machine cleared and all modules in the unvoted position;

FIGURE 31 is a view similar to FIGURE 30 but with the maximum number of modules permitted by a given voting program operated to the voted position and the slack removed from the interlock ribbon;

FIGURE 32 is a side view of an interlock ribbon supply spool, the spool lock in which the spool is removably secured, and a fragment of the module in which the lock is incorporated;

FIGURE 33 is an end view, to an enlarged scale, of a ribbon supply spool;

FIGURE 34 is a view of the ribbon supply spool similar to FIGURE 33 with the ribbon clamping cam removed;

FIGURE 35 is a sectional view of the ribbon supply spool taken substantially along line 35—35 of FIGURE 32; and FIGURE 36 is a sectional view of the ribbon supply spool clamp taken substantially along line 36—36 of FIGURE 32.

Figure 1:
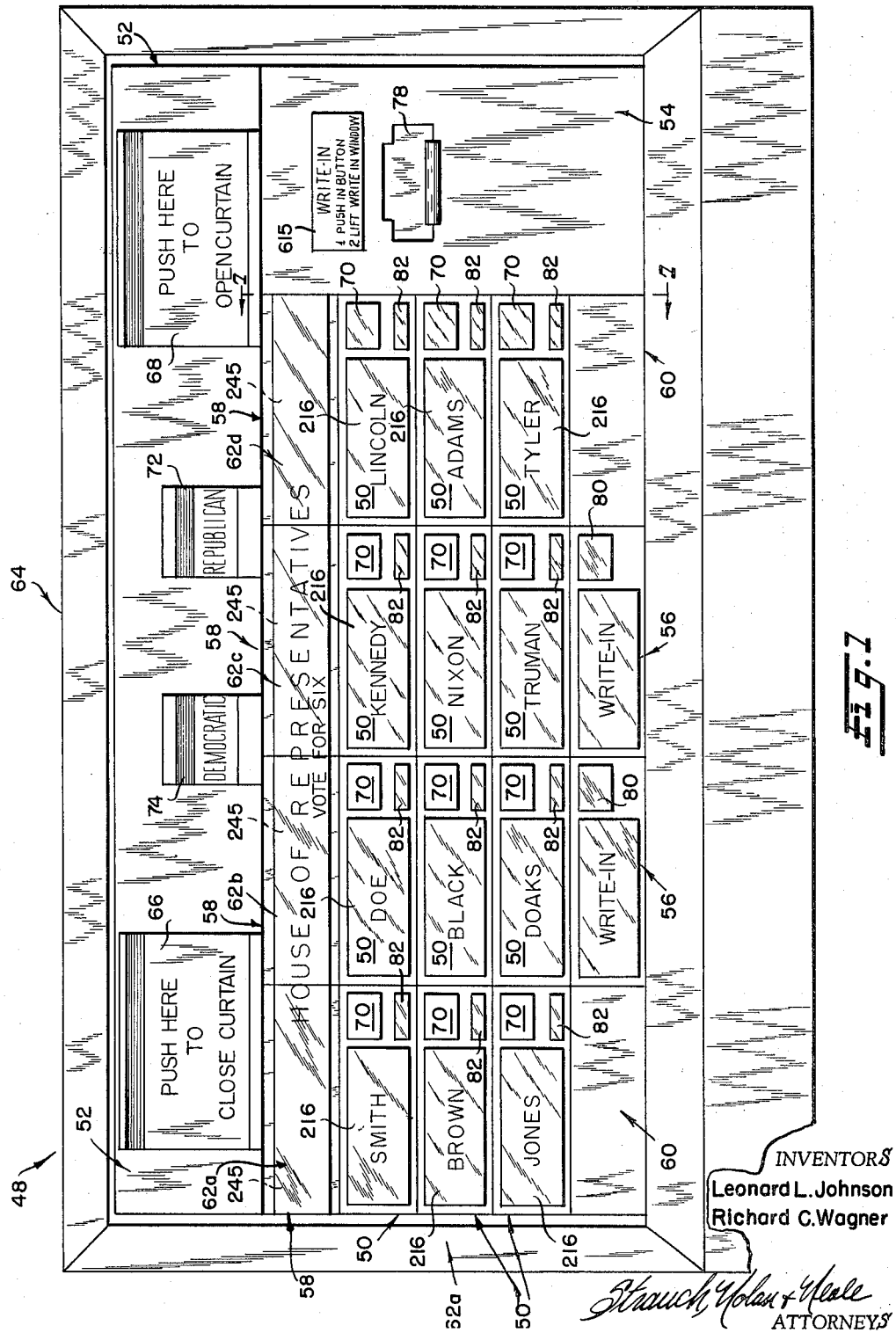
FIGURE 1 is a front view of the novel automatic voting machine provided by the present invention.

Referring now to FIGURE 1 of the drawings, the automatic voting machine 48 provided by the present invention is of modular construction and includes, among its major components, a plurality of voting modules 50 which are arranged in vertical columns 62a to 62d and are independently operable for pointer (that is, individual) voting, a machine control unit 52 which includes respective controls for unlocking and for clearing the voting machine controls and for party voting, a write-in voting unit 54 operated by write-in voting modules 56, and a flexible metallic ribbon interlock 57 (see FIGURES 30 and 31) which limits the number of nominees a voter may select for a particular office to be filled. The foregoing components, together with a plurality of office head modules 58 which are provided to identify the offices to be filled, and a varying number of blank modules 60 which are provided to equalize the number of modules in each of the modular columns 62, are assembled in a housing 64 which may be of any suitable construction. Voting machine 48 is preferably employed in conjunction with a voting booth which may be of conventional construction and which is not illustrated in FIGURE 1 since it forms no part of the present invention.

A voter, entering the voting booth, first depresses a pivoted lever 66 incorporated in machine control unit 52 which unlocks the voting machine and readies it for use. This lever may also be employed to simultaneously close the curtains of the voting booth by employing curtain-controlling mechanism such as that described in Gustavson Patent 2,284,144 referred to above. The voter may then proceed to cast his ballot. After selecting his choices for the office or offices to be filled, the voter depresses a lever 68 also incorporated in machine control unit 52 which clears the machine, actuates appropriate counter mechanism to register the vote, and restores the machine to a locked condition, preventing the machine from registering further votes until unlocked by a subsequent voter. Preferably lever 68 is also connected to an appropriate curtain-opening mechanism to open the curtains of the voting booth. The particular mechanism employed for this purpose, like the curtain closing mechanism, forms no part of the present invention. One satisfactory mechanism which may be employed is described in detail in the Gustavson Patent No. 2,284,144.

The voting machine 48 of the present invention provides two methods by which a voter may select the candidate or candidates he desires to elect to a particular office. First, pointer voting in which the voter may select at random the permissive number of nominees for a particular office. And second, party voting, in which the voter, by depressing a single lever, casts a vote for all of the candidates presented by a given party.

In the illustrated embodiment, the voting machine has been programmed for an election in which six candidates are to be elected to the House of Representatives. It is supposed that six of these candidates have been nominated by each of the major political parties. By depressing the voting button 70 provided on each of the voting modules 50, the voter may select the six candidates he desires without regard to their political affiliation. On the other hand, if the voter wishes to cast a party vote for the six candidates nominated by the Republican party, for example, he may do so by depressing a pivoted lever 72 which will condition the voting machine so that, when it is subsequently cleared, a vote will be registered for each of the candidates associated with the voting modules 50 in the modular columns 62c and 62d. Similarly, if the voter wishes to vote for the six Democratic candidates, he may do so by depressing the pivoted lever 74.

In addition to candidates nominated by political parties, a number of so-called independent candidates may seek election to a particular office. To accommodate independent voters, the voting modules 50 employed in the voting machine of the present invention are provided with novel party latches 76 (see FIGURE 2) which permit the voting modules employed for independent condidates to be uncoupled from the party voting levers 72 and 74. Consequently, votes may be cast for independent candidates only by depressing the voting buttons 70 of the modules provided for those candidates.

In addition to regularly announced candidates, many jurisdictions provide by law that the voter must be given the the opportunity to write in the name of any person he may desire as his nominee for a particular office to be filled. For this purpose, the voting machine of the present invention provides a write-in unit 54 (FIGURE 1) which includes a normally closed and locked write-in ballot access door 78 which, when unlocked provides access to a ballot on which a candidate's name may be written in. The access door 78 is unlocked by depressing the voting button 80 provided on each of the write-in voting modules 56.

At times a voter may, after having selected a candidate, change his mind and desire to cast his vote for another candidate. For this purpose, each of the voting modules 50 is provided with a cancel button 82 which may be depressed to restore the module from a voted to an unvoted condition.

To identify the office to which the candidates are seeking election, an office head module 58 is superimposed on each modular column 62. Although, in the illustrated embodiments, only a single office is to be filled, modular columns 62a and 62b might, in other circumstances, contain voting modules associated with candidates for one office and columns 62c and 62d modules for candidates seeking election to a second office. In this case one label would be employed in the office head modules on columns 62a and 62b and a second label in the office head modules on columns 62c and 62d.

In some elections the number of candidates nominated by a particular party may require a number of voting modules 50 which is not an even multiple of the number of such modules provided in the colums 62. Under these circumstances, the unused voting modules 50 are replaced with blank modules 60 which equalize the number of modules in the columns, but have no voting function.

One of the most important requisites for an automatic voting machine is that it invariably limits the number of candidates for which a voter may cast his ballot. For example, with the voting machine programmed as illustrated in FIGURE 1, the voter is permitted to select six condidates for election to the House of Representatives. It is necessary that the voting machine limit the number of votes the voter may cast to six to prevent him from voting for a larger number of candidates than that to which he is entitled. One of the salient features of the present invention is a novel ribbon interlock 57 (see FIGURES 30 and 31) which cooperates with the voting and write-in modules 50 and 56 to limit the number of candidates a voter may select for election to a particular office. To this end, each of the voting and write-in modules includes an output member 84 (FIGURE 2) which is displaced when the vote button 70 (or 80 in the write-in modules) is depressed to cast a vote for the candidate associated with that module. Looped over rollers 86 carried by the output members 84 and over stationary rollers 88 fixed to module housing 100 is a thin flexible metallic ribbon 90 which, when the machine is cleared and before any votes have been cast, is in a slack condition (see FIGURE 30). As each candidate is voted for, the output member 84 of this module is displaced, reducing the slack in ribbon 90 by a predetermined, equal increment until, when the permitted number of votes have been cast, all of the slack is removed from ribbon 90 which becomes taut, preventing displacement of a further output member 84 and, therefore, preventing the casting of additional votes (see FIGURE 31). The ends of ribbon 90 are secured in a pair of ribbon supply spools 92 removably secured, with the voting machine programmed as illustrated in FIGURE 1, in the blank module 60 in modular columns 62a and 62d. Supply spools 92 may be rotated to vary the slack in ribbon 90 and thereby vary the number of candidates for which a voter may cast his ballot.

*Voting module*

All of the voting modules 50 are identical and, therefore, only one of these modules will be described. As was pointed out above, module 50 includes a vote button 70 which is depressed to cast a vote for the candidate associated with that module and which, upon being depressed, displaces the output member 84 of the module from an unvoted to a voted position. When the voting machine is subsequently cleared by the depression of lever 68 output member 84 is restored to its unvoted position. The restoration motion of the output member is employed to actuate a counter or register (not illustrated) to tally a vote for the associated candidate. The particular counting mechanism employed and the particular motion transmitting linkage interposed between the counter and the output member 84 is not illustrated as it forms no part of the present invention. One suitable form of counter and counter operating mechanism is described in detail in the Gustavson Patent 2,471,567 referred to above.

Vote button 70 and output member 84 of module 50 are coupled by a toggle lock linkage 94 (FIGURE 2) which transmits the movment of botton 70 to output member 84 and, in addition, prevents vote cancellation by by inadvertent or deliberate attempts to select more than the permissive number of candidates for a particular office.

Referring now to FIGURES 3 and 4, vote button 70 is slidably mounted in an aperture 96 formed in a laterally extending vertical member 98 which may be formed of a transparent material such as Lucite, and which forms the front wall of the module housing 100. Mounted in recesses 102 and 104 (FIGURE 7) formed in the upper and lower surfaces, respectively, of vote button 70 and flush with these surfaces are a pair of rearwardly extending, vertically spaced apart straps 106 and 108 which are attached to the vote button as by screws 110 (see FIGURE 3). Pivotally connected to the rear end of straps 106 and 108 by a pin 109 is an arm 112 of a pivotally mounted bellcrank 114. Pin 109 extends between and is fastened to straps 106 and 108 and extends through an aperture 118 formed in bellcrank arm 112. A cylindrical spacer 120 (see FIGURE 7) surrounds pin 109 between crank arm 112 and upper strap 106 and prevents vertical movement of the crank arm.

Bellcrank 114 is pivotally mounted on a vertically extending post 122 (FIGURE 3) secured to the bottom wall 124 of module housing 100 as by a screw (not shown). A pair of spacers 126 and 127 (see FIGURES 2 and 7) journalled on post 122 on the opposite sides of crank 114 prevents vertical displacement of the crank.

Pivotally fixed to the end of a second arm 128 (FIGURE 3) of bellcrank 114 by a pivot stud 130 is a laterally extending link 132 which carries the output member 84, the body 134 of which is slotted to receive link 132. Rivets 136 or like fasteners secure the output member to link 132.

The opposite end of link 132 is connected by a pivot stud 138 to a link 140, the forward end of which is pivotally mounted on a vertically extending post 142 secured to the bottom module housing wall 124 as by a screw (not shown). A cylindrical spacer 144 (see FIGURE 7), journalled on post 142, spaces link 140 from the bottom housing wall.

The center-to-center distance between the post 122 on which bellcrank 114 is pivoted and pivot stud 130 is equal to the center-to-center distance between pivot stud 138 and the post 142 on which link 140 is pivoted. Similarly, the center-to-center distance between pivot studs 130 and 138 is equal to the center-to-center distance between posts 122 and 124. Links 132 and 140 and arm 128 of bellcrank 114 thus form an open four link chain. Since the opposing links of this chain are of equal lengths, link 132 will have a substantially straight line motion in a direction parallel to the centerline between pivot posts 122 and 142. As the latter line is parallel to the rear wall 146 of module housing 100, the motion of link 132 and, therefore, output member 84, will be parallel to this wall.

FIGURES 3 and 4 illustrate the module 50 in its unvoted configuration. When the vote button 70 is depressed as shown in FIGURE 5 to vote for the candidate associated with a particular module, the four link chain described above moves to the position shown in FIGURE 5, moving output member 84 to the voted position. As was indicated above, a toggle linkage is provided to lock output member 84 in this position to prevent vote cancellation which could otherwise be caused by the exertion of a laterally acting force on output member 84 to restore the four link chain to the configuration illustrated in FIGURE 3. The toggle lock linkage consists of a pair of pivoted links 148 and 150. Link 148 is pivotally connected to an intermediate portion of crank arm 128 by a pivot stud 152 and link 150 is pivotally mounted on a vertically extending input shaft 154 which is an elongated cylindrical member having annular shoulders 156 and 158 (FIGURES 3 and 4 respectively) formed adjacent its upper and lower ends, respectively. These shoulders engage top wall 160 and bottom wall 124 of module housing 100, respectively, and provide reduced diameter end portions 162 and 164 which extend through cooperating apertures 166 (only one of which is shown—see FIGURE 2) in walls 124 and 160 to maintain the shaft in vertical alignment. Shaft 154 extends through an aperture 168 in link 150 which is maintained in spaced relationship to the bottom wall 124 of module housing 100 by a retaining ring 170 (see FIGURES 4 and 7) disposed in a suitable annular groove (not shown) in shaft 154. The free ends of link 148 and 150 are pivotally connected by a pivot stud 172.

Secured in the rearmost portion of link 148 is a vertically extending spring mounting post 174 which, in the illustrated embodiment, consists of an externally threaded member 176 having a shoulder abutting the top edge of link 148, member 176 extending through link 148 through a laterally extending notch 177 in crank 114, and into an internally threaded member 178 (see FIGURES 4 and 7) disposed beneath link 148. Connected between members 176 and 178, respectively, and the cylindrical sleeves 127 and 126 surrounding the pivot post 122 on which crank 114 is mounted, are a pair of tension springs 180 and 182.

Figure 5:
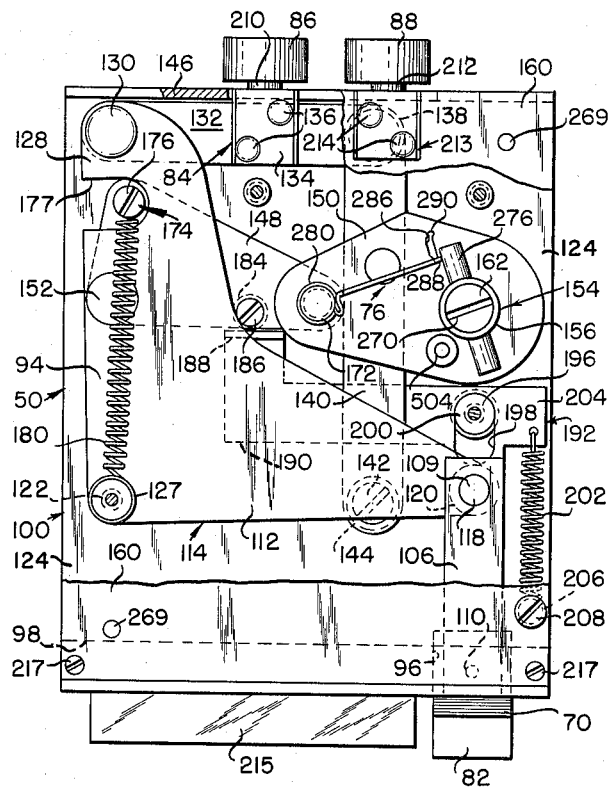
FIGURE 5 is a view similar to FIGURE 3 with the module in the voted configuration.

Referring now to FIGURES 3 and 5, which show module 50 in the unvoted and voted configuration, respectively, crank 114 and link 148 provide an overcenter snap-action linkage. As vote button 70 is depressed, crank 114 is pivoted in a counterclockwise direction about pivot post 122 and pivot stud 152 of link 148 is carried to the left by the rearwardly extending arm 128 of the crank. As link 150 is prevented from lateral movement by the fixed vertical shaft 154 on which it is mounted, the leftward translation of pivot stud 152 causes link 148 to rotate in a clockwise direction about pivot stud 152 and causes link 150 to rotate in a counterclockwise direction about shaft 154. As link 148 rotates clockwise about pivot stud 152, it reaches, and passes through, a dead center position in which the centers of spring mounting post 122, pivot stud 152, and spring post 174 are aligned. After the dead center position is passed, springs 180 and 182 will impart a snap movement to link 148 and therefore, to link 150 to move these links to the positions shown in FIGURE 5. In this position, a depending lug 184 secured to link 148 as by a screw 186 engages an abutment provided by a vertically extending lug 188 formed on a laterally extending arm 190 of an L-shaped unlatching link 192 on the forward end of which the cancel button 82 is mounted. Abutment 188 prevents clockwise motion of link 148 and counterclockwise motion of link 150 beyond the position shown in FIGURE 5, wherein a dead-center or over-center alignment between pivot studs 152, 172, and shaft 154 is achieved.

If a lateral force, acting to the right (FIGURE 5), is exerted on the module output member 84 or on the roller 86 attached to it, it will tend to move link 132 to the right and to rotate crank 114 in a clockwise direction about post 122 to restore the mechanism to the configuration shown in FIGURE 3. The clockwise force exerted on crank 114 will tend to movet pivot stud 152 and link 148 to the right and, acting through pivot stud 172, will also tend to move link 150 to the right. However, lateral movement of link 150 is prevented by the shaft 154 on which it is pivotally mounted so that aligned links 148 and 150 in effect provide a solid link between shaft 154 and crank 114. Rearward movement of pivot stud 172, which would destroy the solid link thus provided, is prevented by springs 180 and 182 which bias link 148 against abutment 188.

As was indicated above, the voter may desire, after having voted for one candidate, to cancel his vote and select another. To provide for deliberate vote cancellation, the cancel button 82 is employed. Cancel button 82 is fixed as by a screw 193 (FIGURE 4) to the forward end of the L-shaped link 192 and extends through a slot 194 in the front wall 98 of the module housing.

Link 192 is mounted for rearward and forward movement by cancel button 82 and the slot 194 in which it is disposed and by a post 196 secured to the bottom wall 124 of the module housing as by a screw (not shown) which extends upwardly through an elongated slot 198 in link 192. A cylindrical spacer 200 (see FIGURE 4), surrounding the lower end of post 196, spaces link 192 from the bottom housing wall 124. Cancel button 82 and link 192 are biased outwardly to the inoperative position in which the rearward end of slot 198 engages post 196 (see FIGURE 5) by a spring 202 connected to a laterally extending projection 204 of link 192 and to a vertically extending post 206, secured to the module housing by screws 208, and provided with an annular groove 209 in which the spring end is received (see FIGURE 7).

When the voter desires to cancel his vote, he pushes cancel button 82 inwardly, moving link 192 to the rear. Since the abutment 188 formed on the left end of the arm 190 of link 192 is engaged with the pin 186 depending from link 148, rearward movement of link 192 imparts a counterclockwise movement to link 148 and a clockwise movement to link 150. This rotational movement of links 148 and 150 moves pivot stud 172 rearwardly. As the pivot stud passes through the dead center position in which it, pivot stud 152, and shaft 154 are aligned, the substantially rigid connection formed by links 148 and 150 is unlocked. At the same time, spring mounting post 174 moves through the dead center position formed by the alignment of pivot post 122, pivot stud 152, and post 174. As a result, springs 180 and 182 pull link 148 counterclockwise imparting a clockwise rotational movement to crank 114 to restore output member 84 to the unvoted position shown in FIGURE 3.

The roller 86 described above is fixed to an integral shaft portion 210 of output member 84 as by a retaining ring (not shown). Shaft portion 210 extends through an elongated horizontal slot 211 in the rear wall 146 of the module housing. Roller 88 is similarly fixed to an integral shaft portion 212 of a roller supporting member 213 fixed to the top wall 160 of the module housing as by rivets 214.

In addition to the operating mechanism described above, module 50 may be provided with a name block 215 in which a label 216 (see FIGURE 1) bearing the name of of the candidate may be removably inserted. In order to provide ready access to the operating mechanism described above, the top wall 160 of the module housing 100 is removably secured in place by the screws 208 described above and by screws 217 extending into front housing wall 98.

*Write-in modules*

The write-in modules 56 may, with the exception pointed out hereinbelow, be similar to the voting modules 50. Because of this similarity and because their details form no part of the present invention, the write-in modules have not been separately illustrated.

The major distinction between the voting and write-in modules is that the output member 84 of the write-in module 56 is connected by a mechanical linkage such as a Bowden cable 218 (see FIGURE 24) to the ballot access door latching mechanism incorporated in the write-in unit 54 rather than to a counter. Depression of the vote button 80 of the write-in module 56 unlatches this mechanism, permitting the ballot access door 78 to be raised to expose a ballot upon which the name of a selected nominee may be written.

*Office head module*

Referring now to FIGURE 6, the office head module 58 includes a housing 219 similar to the housing 100 of voting module 50. Rotatably mounted in housing 219 in the same manner that shaft 154 is mounted in housing 100 is a vertically extending shaft 220 which is identiical to shaft 154.

Fixed to the bottom wall 222 of housing 219 as by screws 223 is a supply spool clamp 224 which may be employed to detachably secure a ribbon supply spool 92 to the housing. A circular aperture 226, formed in the rear housing wall 228 permits the supply spool (not illustrated in FIGURE 6) to be inserted into the clamp 224. Clamp 224 includes an L-shaped member 230 and a spring clip 234, secured to member 230 as by screws (not shown), in alignment with aperture 226.

The front wall of the office head module 58 is a plastic member 236 (FIGURE 6 and 7) having a substantially U-shaped cross-sectional configuration. The top and bottom walls 238 and 222 of the module housing are received in rearwardly directed, laterally extending notches 239 and 240 formed in the flanges 241 and 242 of member 236 and are flush with the upper and lower edges of these flanges to which they are secured by screws 244. Office identification is provided by a label 245 (see FIGURE 1) disposed in a slot 246 provided between front wall member 236, which is preferably of a transparent plastic such as Lucite, and a label supporting member 248. Member 248, which also may be of Lucite, has a substantially rectangular cross-section and is dimensioned to provide a snug sliding fit between the flanges 241 and 242 of member 236. Flanges 250 formed on the rear edge of member 248 abut the rear edges of the flanges 241 and 242 of member 236 (see FIGURE 7).

Posts 252 extend between and are secured to the top and bottom wall members 238 and 222 of the module housing by screws 254 (see FIGURES 6 and 7) to strengthen and add rigidity to the module. In the illustrated embodiment of office head module, four such posts 252 are employed. A spring clip 256 (FIGURE 7), assembled to two adjacent posts 252, is received in an annular groove 258 in rotatable shaft 220 and, being biased against this shaft, exerts a slight frictional drag on it. A roller-supporting member 260 is fixed to the top wall 238 of the module 58 by screws 262. A roller (not illustrated) similar to the rollers 86 and 88 described above may be fixed on the rearwardly extending shaft 264 of this member to provide added programming flexibility.

*Blank Modules*

The blank module 60 (see FIGURE 7) is, with certain exceptions noted below, identical to the office head module 58. Like reference characters have therefore been employed to identify like elements in these two modules. Since no office or candidate identifying label is employed with the blank module 60, the two-member front wall of the office head module housing is, in the blank module 60, replaced with a single, rectangularly sectioned wall member 266 which may conveniently be fabricated of Lucite and to which the top and bottom walls 238 and 222 of the module housing are secured as by screws (not shown in FIGURE 7). Preferably, the top and bottom edges of wall member 266 are recessed so that the bottom and top walls 222 and 238 are flush with these edges.

Like office head module 58, blank module 60 is provided with a roller supporting member 260 including a roller shaft 264 extending rearwardly from the rear wall 228 of the module housing. Normally, a roller 267, identical to the rollers 86 and 88 described above, is journalled on shaft 264 and secured in place by a retaining ring (not shown).

*Modular Array*

Referring now to FIGURES 1 and 7, each of the modular columns 62a to 62d illustrated in FIGURE 1 includes three voting modules 50 and an office head module 58. In addition, columns 62a and 62d include blank modules 60 and columns 62b and 62c include write-in modules 56. Referring especially to FIGURE 7 in which column 62d is illustrated, the modules are assembled in a vertically stacked arrangement. Projections 268 formed on the bottom walls of the modules 50 (see FIGURE 4) cooperate with recesses 269 formed on their top walls (see FIGURE 5) to maintain the modules aligned. Similar, like-numbered recesses and projections are formed on modules 56, 58 and 60 for the same purpose. In the assembled configuration rectangular projections 270 formed on the upper ends of the shafts 154 of modules 50 extend upwardly into like configured slots 272 in the shafts 154 of the superjacent modules. Thus, the shafts 154 of the several modules 50 will rotate as a single unit. The projection 270 on the shaft 154 of the uppermost module 50 fits into a slot 272 formed on the lower end of the shaft 220 of office head module 58. Shaft 220, in turn, is operatively connected to one of the party levers 72 or 74. Consequently, depression of the party lever 72 or 74 to which a shaft 220 is connected will rotate module shafts 154 and 220.

To connect shafts 154 to the output member operating mechanism 94 of the voting modules 50, horizontally extending pins 276 are fixed in the shaft. When the party lever is depressed, shafts 154 are rotated (looking down on the top of columnar array 62d) in a counterclockwise direction, rotating shafts 154 from the position illustrated in FIGURE 3 to the position illustrated in FIGURE 5. As shafts 154 rotate, pins 276 engage non-partisan latches 76 which move links 150 in a counterclockwise direction, causing rotation of links 148 in a clockwise direction. Clockwise movement of links 148 rotates cranks 114 in a counterclockwise direction about their pivot shafts 122. Thus the same type of motion is imparted to each crank 114 as by the depression of the associated vote button 70. As was described at length above, the counterclockwise movement thus imparted to crank 114 is effective to move the output member 84 of the vote module 50 in which it is incorporated to the voted position.

As was pointed out above, the non-partisan latch 76 is provided to accommodate independent voters. For this purpose, the operating mechanism 94 of voting modules 50 associated with independent candidates must be operatively disconnected from their rotatable input shafts 154 so that, when the associated party lever is depressed, the output member of the voting module associated with the independent candidate will not be moved to the voted position. The non-partisan latch 76 affords a simple and accessible means for connecting shaft 154 and operating mechanism 94 and for disconnecting these members.

Referring now specifically to FIGURES 2 and 3, non-partisan latch 76 is an elongated member which may be conveniently fabricated from wire or the like. A loop 280 formed in one end of latch 76 surrounds the pivot stud 172 coupling links 148 and 150 and pivotally fixes the latch to this stud. The opposite end of latch 76 is bent in a substantially U-shaped configuration providing a pair of legs 282 and 284. Leg 284 extends downwardly through a slot 286 formed in link 150. As is shown in FIGURE 3, a pair of notches 288 and 290 are formed in slot 286. When voting module 50 is associated with a party candidate, link 76 is positioned as illustrated in FIGURES 2 and 3 with its leg 284 in notch 288. This provides the mode of operation described above in which rotation of voting module input shaft 154 is effective to operate the voting module mechanism 94. On the other hand, when voting module 50 is associated with an independent candidate, latch 76 is moved in a counterclockwise direction until leg 284 falls into recess 290. In this position, non-partisan latch 76 will not be engaged by the pin 276 extending from shaft 154 when the latter is rotated. Thus depression of the party latch, while rotating shaft 154, will have no effect on the module operating mechanism 94. The U-shaped configuration of the non-partisan latch 76 described above provides a spring effect which biases the latch leg 284 into engagement with notches 288 and 290.

As was pointed out above, the unitary shaft provided by the interconnected shafts 154 and 220 of the modules is rotated by depression of the appropriate party lever 72 or 74. For this purpose, the rectangularly sectioned lug 270 referred to above is provided on the upper end of the module shaft 220 in office head modules 58. With particular reference now to FIGURE 8, when the machine control unit 52 is assembled to the columnar array 62a–d, lugs 270 are received in correspondingly-sectioned slots 292 formed in the lower shaft-like end of pivotally mounted cranks 294 incorporated in the machine control unit (see also FIGURES 9 and 18). Thus rotation of a crank 294 is effective to rotate the input shafts 154 of the modules 50 and 56 in the associated modular columns 62a–d.

*Machine Control Unit*

Referring now to FIGURES 13–17, the major control components of the machine control unit 52 are a pair of horizontally extending, super-imposed party rails 296 and 298. Rails 296 and 298 operate cranks 294 which may be selectively connected to either of the party rails by a detent assembly 299. The party rails are displaced to various prescribed positions by (1) the curtain closing lever 66 to unlock and reset the voting machine, (2) the party levers 72 and 74 to affect party voting, and (3) curtain opening lever 68 to clear and lock the machine and register the vote. The party rail operating mechanism connecting the foregoing levers to party rails 296 and 298 is indicated generally by reference character 300 in FIGURE 17 and will be described in detail presently.

Rails 296 and 298 are slidably mounted on a guide bar 301 supported by the bottom wall 302 of machine control unit housing 304 and are guided by a pair of rectangularly sectioned guides 306 and 308 secured to bottom wall 302 as by Allen head screws 310 which also extend through and secure in place the housing top wall 311. Elongated slots 312 in rails 296 and 298 surround cranks 294 and permit free sliding movement of the rails relative to the cranks.

Figure 18:
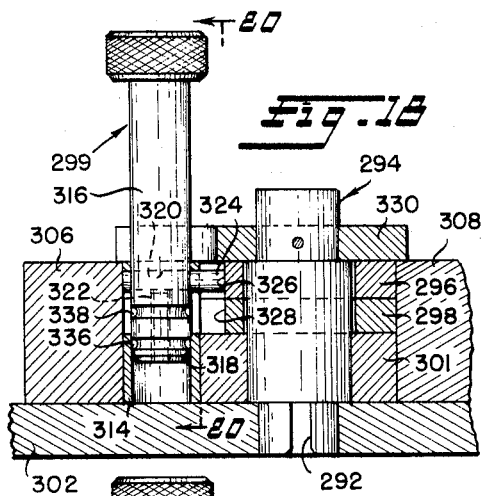
FIGURE 18 is a sectional view, taken substantially along line 18—18 of FIGURE 14, illustrating the positioning of a party programming pin to couple the associated column of modules to the upper party rail.

Cranks 294a–d are selectively connected to one of the two party rails 296 or 298 by the detent assemblies 299a–d. Referring next to FIGURES 13 and 18, each of the detent assemblies 299a–d, which are identical, consists of a rectangularly sectioned member 314 mounted for sliding movement between party rails 296 and 298 and guide 306 and a vertically extending party program pin 316 disposed in a cylindrical through aperture 318 in member 314. Fixed in an aperture 320 in the party program pin 316 by an Allen head screw 322 is a horizontally extending pin 324 which is, depending upon the program set in the voting machine 48, received in an aperture 326 formed in the edge of party rail 296 abutting member 314 or in a similar aperture 328 formed in party rail 298 (see FIGURE 19). Thus the detent assembly 299 is constrained to move with the party rail 296 or 298 to which the horizontally extending pin 324 is connected. The linear movement imparted to detent assembly 299 by the party rail to which it is coupled is translated to rotational movement of crank 294 by a bifurcated crank arm 330 which surrounds the shank of the party program pin 316 (see especially FIGURE 13).

Figure 19:
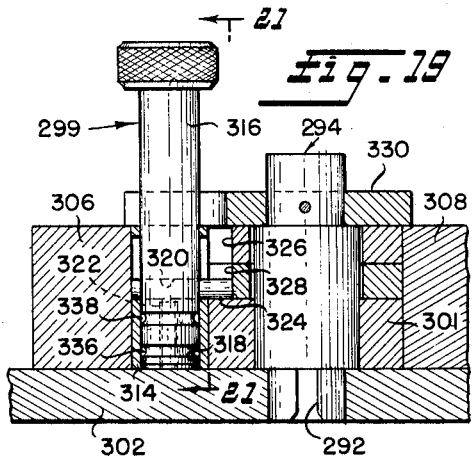
FIGURE 19 is a view similar to FIGURE 18 taken substantially along line 19—19 of FIGURE 14 and illustrating the positioning of a party programming pin to couple the associated column of modules to the lower party rail.
Figures 20, 21:
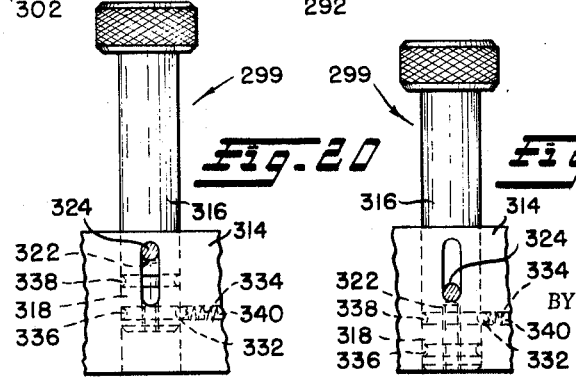
FIGURE 20 is a view of the programming pin and a portion of the slide block in which it is supported with the pin in its upper position and is taken substantially along line 20—20 of FIGURE 18.
FIGURE 21 is a view similar to FIGURE 20 taken substantially along line 21—21 of FIGURE 19 and showing the programming pin in its lower position.

Party program pin 316 is retained in its upper position as shown in FIGURE 18 or, alternatively, in its lower position as shown in FIGURE 19, by a spring-loaded, ball-like detent 332 (FIGURES 20 and 21) disposed in a horizontally extending bore 334 formed in member 314 which intersects the vertically extending through aperture 318 in which party program pin 316 is disposed. Detent 332 extends into an annular recess 336 in party program pin 316 when the latter is in the upper position wherein pin 324 is engaged with the upper party rail 296 and into a similar recess 338 in the party pin when it is in the lower position wherein pin 324 is engaged with the lower party rail 298. A coil spring 340, disposed in horizontally extending bore 334 behind ball 332, biases the ball into one or other of the annular pin recesses. Ball 332 and spring 340 may be retained in bore 334 as by an Allen head screw (not shown).

Party lever 72 is operatively connected to upper party rail 296 and party lever 74 is similarly connected to lower party rail 298. Referring again to FIGURE 1, it will be assumed, for the purposes of explanation, that the candidates associated with voting modules 50 in columns 62c and 62d have been nominated by the Republican party and that the candidates associated with voting modules 50 in columns 62a and 62b have been nominated by the Democratic party. To program voting machine 48 for party voting in this circumstance, party program pins 316c and 316d are moved to the upper position as shown in FIGURE 18 and party program pins 316a and 316b are moved to the lower position as shown in FIGURE 19. If party lever 72 is thereafter depressed, party rail 296 will be horizontally displaced together with detent assemblies 299c and 299d, thereby rotating cranks 294c and 294d in a counterclockwise direction. As was discussed under Modular Array, the simultaneous counterclockwise rotation of cranks 294c and 294d will move all six of the voting modules 50 in columns 62c and 62d from the unvoted to the voted position. Depression of party lever 74 will similarly operate the six voting modules 50 in columns 62a and 62b from the unvoted position to the voted position.

The nature and operation of the linkage 300 actuated by the curtain closing lever 66, the curtain opening lever 68, and the party levers 72 and 74 to displace party rails 296 and 298 may best be understood by the ensuing discussion and FIGURES 9–17 of the drawings. For convenience in describing this mechanism, it will be assumed that voting machine 48 has been cleared and locked and the vote registered so that machine control unit 52 is in the configuration illustrated in FIGURES 9 and 13.

Figures 17A, 17B:
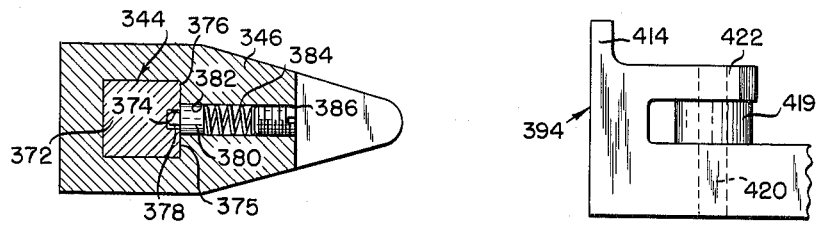
FIGURE 17a is a sectional view of the party rail operating crank taken substantially along line 17a—17a of FIGURE 17.
FIGURE 17b is a side view of the reset bellcrank operating slide.
Figure 17:
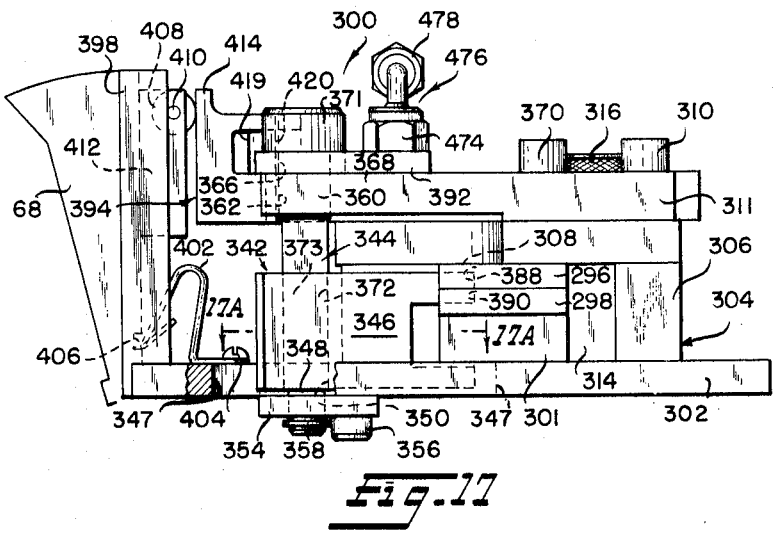
FIGURE 17 is a right end view of the machine control unit.

Referring first to FIGURES 13 and 17, the major control element interposed between party rails 296 and 298 and the curtain opening and closing levers 66 and 68, respectively, is a crank assembly 342 which includes a vertically extending, rotatably mounted shaft 344 and a rearwardly extending crank arm 346 fixed to its lower end and partially disposed in a recess 347 (FIGURE 17) in housing bottom wall 302. The lower end portion 348 of shaft 344 has a circular section and extends through circular, aligned through apertures 350 in the bottom wall 302 of the machine control unit housing and 352 in a shaft supporting block 354 fixed to bottom wall 302 by Allen head screws 356 (one of which is shown in FIGURE 17). A retainer ring 358 fitted into a cooperating groove (not shown) in the lower end of shaft 344 retains the shaft in place.

Adjacent its upper end, a circularly sectioned portion 360 of shaft 344 extends through a circular aperture 362 in the top wall 311 of the machine control unit housing and through an aligned, circular aperture 366 in a guide member 368 secured to the housing top wall by Allen head screws 370 (see FIGURE 17).

An enlarged diameter head 371 formed on the upper end of shaft 344 provides an annular shoulder which abuts the upper surface of guide member 368 to prevent downward movement of the shaft.

Crank arm 346 has a vertically extending, rectangularly sectioned, aperture 372 through which the rectangularly sectioned main body portion 373 of shaft 344 extends. To facilitate the orientation of crank arm 346 on shaft 344, a vertically extending groove 374 is formed in the flat vertical edge surface 375 of the rectangularly sectioned shaft main body portion 373 (see FIGURE 17a). Groove 374 receives the end portion 378 of a spring biased detent 380 disposed in a horizontally extending through aperture 382 formed in the crank arm. Detent 380 and its biasing spring 384 are retained in the aperture by an Allen head screw 386.

Referring now to FIGURE 17, the rear end of crank 346 extends into trapezoidal recesses 388 and 390 in party rails 296 and 298, respectively. Thus, when crank 346 is pivoted by shaft 344, it engages the trapezoidal recess side walls imparting sliding movement to the party rails 296 and 298.

Referring to FIGURES 9 to 17, it can be seen that curtain opening lever 68 is operatively connected to crank assembly 342 by a crank 392 fixed to the enlarged head 371 on the upper end of shaft 344 and by a reciprocating slide 394 which operates in a manner that can best be understood after first describing lever 68 in some detail. Curtain opening lever 68 is fixed to the machine control unit housing bottom wall 302 by a conventional trunk-type hinge 396 (FIGURE 15) which mounts it for pivotal movement about a horizontal axis between vertically extending front wall members 398 and 400 of the machine control unit housing. Lever 68 is biased forwardly to its normal inoperative position shown in FIGURE 17 by a wire spring 402 fixed to the machine control unit housing bottom wall 302 by a screw 404. The forward end of spring 402 rests in an aperture 406 formed in lever 68 adjacent its lower hinged end.

Adjacent its upper edge, lever 68 carries a rotatable, preferably plastic, roller 408. Roller 408 is journalled on a horizontally extending shaft 410 fixed in a bifurcated support 412 mounted on lever 68 as by screws (not shown). When lever 68 is depressed (i.e., pivoted in a clockwise direction as shown in FIGURE 17), roller 408 engages a vertically extending projection 414 formed on the forward end of the reciprocating slide 394 which is guided by the guide 368 described above and by a guide 415 secured to the machine control unit top wall 364 by Allen head screws 416. The force exerted by roller 408 moves slide 394 toward the rear of the machine control unit through a stroke limited by a vertical stop 417 fixed to housing top wall 364 (see FIGURE 9) which extends upwardly through an elongated slot 418 formed in the rear end of the slide.

Adjacent its forward end, slide 394 carries a roller 419 (see FIGURE 17b) similar to the roller 408. Roller 419 is journalled on a vertical extending shaft 420 which is fixed in the main body portion of slide 394 on which plastic roller 419 rests and an arm 422 spaced above the slide main body portion and extending rearwardly from the vertical projection 414 at the front end of the slide. As slide 394 moves rearwardly, roller 419 engages the arm 424 of crank 392 rotating the crank and the shaft 344 of crank assembly 342 in a clockwise direction. Crank 346, being fixed to shaft 344, also rotates in a clockwise direction, engaging the sides of the recesses 388 and 390 in party rails 296 and 298 and moving these rails to the right to the position shown in FIGURES 9 and 13.

Referring now specifically to FIGURE 9, the curtain closing lever 66 is connected to crank 392 by a reciprocable slide 426, a crank 428 and a drag link 430 connected to and extending between cranks 392 and 428. The curtain closing lever 66, like the curtain opening lever 68, is mounted for pivotal movement about a horizontal axis between machine control unit housing front wall members 400 and 432 by a conventional trunk-type hinge 434 fastened to the machine control unit housing bottom wall 302 and to the lower edge portion of lever 66. A wire spring 436 similar to the wire spring 402 described above and fastened to the machine control unit housing bottom wall 302 by screw 438 biases lever 66 to its normal, forward, inoperative position shown in FIGURE 9.

Adjacent the intersection of its lefthand and upper edges, lever 66 carries a preferably plastic roller 440 which is fixed in a roller support 442 substantially identical to the support 412 described above, and which is therefore not believed to require further elaboration.

When the curtain closing lever 66 is depressed (see FIGURE 10), roller 440 engages the forward end of the reciprocable slide 426 which is guided by a pair of vertical extending guide studs 444 and 446 fitted into housing bottom wall 302 and extending upwardly through elongated slots 448 and 450 formed in the slide. Slide 426 is biased forwardly to the position shown in FIGURE 9 by a spring 452 attached to a stud 454 fixed to the rear end of slide 426 and to a stud 456 fixed to the housing top wall 311.

Slide 426 is operatively connected to crank 428, which is pivotally mounted on a pivot stud 458 threaded into the housing top wall 311, by a depending pin 462 fixed to the slide and extending through a V-shaped slot 464 formed in the crank arm 465. Drag link 430 is connected to the opposite arm 466 of crank 428 by a ball and socket assembly 468 including a socket member 470 threaded into the crank arm and a cooperating ball member 472 into which the end of drag link 430 is threaded. The opposite end of link 430 is threaded into the ball member 474 of an identical ball and socket assembly 476. The socket member 478 of assembly 476 is fixed to the arm 424 of crank 392. Thus, when lever 66 is depressed, moving slide 426 rearwardly, clockwise movement is imparted to crank 428 pulling drag link 430 to the left. Link 430, moving to the left, rotates crank 392 and crank assembly 342 in a counterclockwise direction. Crank 392, rotating counterclockwise, moves reciprocable slide 394 forwardly to the inoperative position shown in FIGURE 10. Crank 346 of crank assembly 342, rotating counterclockwise, moves party rails 296 and 298 to the left from the locked position shown in FIGURE 13 to the unlocked or reset position shown in FIGURE 14.

As was pointed out above, party lever 72 is operatively connected to the upper party rail 296 and party lever 74 is operatively connected to the lower party rail 298. Since the mechanism connecting each of the party levers to its associated party rail is identical, only the mechanism connecting lever 72 to party rail 296 will be described. The major operating element connecting party lever 72 and upper party rail 296 is a cam 480 pivotally mounted in a recess 482 formed in the upper edge of party rail guide 308 on a vertically extending camshaft 484 threaded into the guide. At its lower end, cam 480 is provided with a laterally extending finger 486 which is adapted to engage the side wall of a slot 488 formed in party rail 296 to move the party rail to the left from the position of FIGURE 14 to the position of FIGURE 15 to operate the voting modules 50 in column 62c and 62d from the unvoted to the voted position by counterclockwise rotation of cranks 294c and 294d. Counterclockwise movement is imparted to cam 480 by a rigid link 490 connected between it and party lever 72, which is mounted for pivotal movement about a horizontal axis in an aperture 492 in machine control unit housing front wall member 400 by a trunk-type hinge (not shown). Lever 72 is biased to its normal, forward, inoperative position as shown in FIGURE 16 by a wire spring 493 fixed to machine control unit housing bottom wall 302 by a screw 494 and engaging the rear surface of lever 72. The link 490 interposed between pivoted lever 72 and cam 480 has conical end portions 495 and 496 which are received in conical depressions (not shown) in the rear surface of lever 72 and in the forward surface of cam 480, providing a swivel joint between link 490 and cam 480 and between the link and lever 72. A spring 497 prevents the ends of member 490 from being displaced from these recesses. The rear end of spring 497 is attached to a stud 498 fixed to cam 480 and the forward end to a stud 500 fixed to a support 502, which, in turn, is mounted on lever 72 as by screws (not shown).

Party lever 74 is connected to its cam 480 in an identical manner.

In the ensuing discussion of the operation sequence of machine control unit 52, it will be assumed that voting machine 48 has been cleared and the machine returned to the locked position. Under these circumstances, machine control 52 will be in the configuration shown in FIGURES 9 and 13. With machine control unit 52 thus positioned, unauthorized persons will be prevented from voting by a lock provided as follows. With cranks 294a–d positioned as shown in FIGURES 9 and 13, the shafts 154 of voting modules 50 and write-in modules 56 are positioned as shown in phantom lines in FIGURE 3. It will be recalled that when the vote button 70 of a voting module 50 is depressed, pivoted toggle lock link 150 is moved in a counterclockwise direction about shaft 154.

However, when machine control unit 52 is in the locked configuration shown in FIGURES 9 and 13, the voting module shaft 154 is locked in the phantom line position. In this position the horizontally extending pin 276 fixed in shaft 154 abuts a stop 504 fixed to link 150, thereby preventing its counterclockwise rotation and, therefore, the depression of vote button 70.

Referring again to FIGURES 9 and 13, party rails 296 and 298 are displaced to the right so that the fingers 486 of cams 480 operated by party levers 72 and 74 cannot enter the slots 488 in the party rails. Thus levers 72 and 74 cannot be depressed and party voting is also prevented.

In the voting process, the first step taken by the voter is to depress the curtain closing button 66 to unlock the voting machine and, preferably, to close the curtains of a voting booth. Depression of lever 66, as was explained above, moves reciprocable slide 426 rearwardly from the position shown in FIGURE 9 to the position shown in FIGURE 10, rotating crank 428 in a clockwise direction about pivot stud 458 and pulling drag link 430 to the left. The movement of drag link 430 rotates crank 392 and crank assembly 342 in a counterclockwise direction. As crank 346 of crank assembly 342 rotates counterclockwise, it engages the side wall surfaces of the recesses 388 and 390 formed in the righthand ends of the party rails 296 and 298 moving the party rails to the left from the position shown in FIGURE 13 to the position shown in FIGURE 14, aligning the slots in the party rails with the fingers 486 of party lever operated cams 480. As the party rails 296 and 298 slide to the left, they carry with them the detent assemblies 299a–d connected to cranks 294a–d, rotating cranks 294a–d counterclockwise from the position shown in FIGURE 13 to the position shown in FIGURE 14. Cranks 294a–d, in turn, rotate the shafts 154 of voting modules 50 from the position shown in phantom lines in FIGURE 3 to the position shown in full lines, freeing toggle lock links 150 of the voting modules for rotation.

The voter is now free to cast his ballot. He may do so by selecting six candidates without regard to party affiliation and regardless of whether their names appear on the voting modules 50 by depressing the vote buttons 70 of the appropriate voting modules 50 or the vote buttons 80 of the write-in modules 56 (pointer voting). Alternatively, the voter may cast his ballot for the entire slate of candidates presented by a party by depressing the appropriate party lever 72 or 74 (party voting). Voting by the pointer method has no effect on the machine control unit 52 since pointer voting does not displace the module shaft 154 from the full line portion of FIGURE 3. The operation of machine control unit 52, if the voter elects to cast his ballot by employing the party method, may best be understood by reference to FIGURES 11 and 15. To vote, for example, for the six Republican candidates (with the machine programmed in the manner illustrated), lever 72 is depressed as shown in FIGURES 11 and 15, rotating the cam 480 connected to that lever counterclockwise from the position shown in FIGURE 14 to the position shown in FIGURE 15. As cam 480 rotates, finger 486 engages the side wall of the slot 488 formed in the edge of party rail 296, moving the party rail to the left and rotating cranks 294c and 294d from the position shown in FIGURE 14 to the position shown in FIGURE 15. This, in the manner explained above under the sub-heading Modular Array, moves the input shafts 154 of the voting modules 50 in columns 62c and 62d from the position shown in solid lines in FIGURE 3 to the position shown in FIGURE 5, thus moving the output members 84 of the six voting modules in columns 62c and 62d from the unvoted to the voted position. The operation of the machine control unit 52 is identical if the voter depresses party lever 74 to vote for the six Democratic candidates except, as shown in FIGURES 12 and 16, the lower party rail 298 is translated to the left rather than upper party rail, rotating cranks 294a and 294b rather than cranks 294c and 294d. As a consequence, the output members 84 of the six voting modules 50 in columns 62a and 62b are moved to the voted position and the output members of the voting modules in columns 62c and 62d remain in the unvoted position.

The next step in the machine control unit operation sequence occurs when the voter has selected his candidates. As this point, the voter depresses the curtain opening lever 68. Depression of lever 68 clears the voting machine, thereby actuating counter mechanism to register the vote, and returns the machine to the locked position of FIGURES 9 and 13. More specifically, depression of lever 68 moves reciprocable slide 394 rearwardly causing roller 419 to engage the arm 424 of crank 392 and rotate the latter together with crank assembly 342 in a clockwise direction. Crank 346 of the crank assembly engages the side walls of the slots 388 and 390 formed in the righthand ends of the two party rails 296 and 298, moving both rails to the right to the position shown in FIGURES 9 and 13. As party rails 296 and 298 move to the right, they rotate cranks 294a–d in a clockwise direction to the positions shown in the above figures.

Referring now to FIGURES 3, 5 and 7, the clockwise rotational movement of cranks 294a–d is transmitted to the shafts 154 of the twelve voting modules 50 in columns 62a–d moving them, if voted by the party method, from the position shown in FIGURE 5 to the position shown in phantom lines in FIGURE 3. The shafts 154 of the voting modules 50 which were not voted or which were voted by the pointer method will have remained in the position shown in full lines in FIGURE 3. Rotation of cranks 294a–d will similarly move the shafts of these modules from the full line position clockwise to the position shown in phantom lines in FIGURE 3.

As each of the shafts 154 rotates, the horizontally extending pin 276 fixed in it engages the stop 504 fixed to link 150, rotating the link in a clockwise direction about the shaft 154 and moving the pivot stud 172 connecting link 150 and 148 to the rear. As was explained above in the description of the cancel button 82 under the sub-heading Voting Module, this restores the output member 84 of the voting module 50 from the voted to the unvoted position. The restoration motion of the output member, as was also explained above, may be employed to operate a counter to register a vote for the candidate associated with the particular voting module. Thus, at this point, the machine will have been cleared, the vote registered, and the machine returned to the locked position illustrated in FIGURES 9 and 13 and described above.

*Write-in unit*

The write-in unit 54 illustrated in FIGURE 24 includes a write-in ballot access door 78 which may be raised to expose a write-in ballot, a door locking mechanism 506, which normally latches door 78 in the closed position illustrated in FIGURE 24, a plurality of input members 218 (four in the illustrated embodiment) which may be actuated by the write-in modules 56 to unlock door 78, and an interlock channel 508 which prevents two (or more) of the input members 218 from being simultaneously actuated. It is contemplated that a conventional paper supply and transporting mechanism will be employed with the write-in unit 54. Since this mechanism is conventional and since it forms no part of the present invention, it has not been illustrated.

As is shown in FIGURES 22–24, ballot access door 78 is mounted for vertical sliding movement between a face plate 510 and ledges 512 formed in a pair of vertically extending, laterally spaced apart, rectangularly sectioned standards 514 and 516 to which face plate 510 is fastened as by screws (not shown). Shoulders 518 extending normally from ledges 512 cooperate with the lateral edges of ballot access door 78 to further guide its vertical movement. A slot 520 is provided in face plate 510 so that, when ballot access door 78 is in the open position (see FIGURE 28), a ballot will be exposed.

The ballot access door locking assembly 506, referred to above, embraces a crank assembly 522 and a pair of locking members 524 (only one of which is shown). Crank assembly 522 includes a horizontally extending shaft 526 having cylindrically sectioned end portions 527 fixed in apertures 528 and 530 in standards 514 and 516 (see FIGURE 23).

The central portion 532 of shaft 526, which has a square cross-section, extends through correspondingly sectioned apertures 534 (see FIGURE 24) formed in the upper ends of a pair of laterally spaced apart, depending crank arms 536 (see FIGURES 24 and 23). At its lower end, each of the depending crank arms 536 carries a pin 538 which extends horizontally into a slot 540 formed adjacent the rear end of the associated locking member 524. Locking members 524 are rectangularly sectioned, elongated bars slidably mounted in downwardly opening recesses 542 formed in the bottom of standards 514 and 516. Recesses 542 are closed by plates 544 secured to the bottom of the standards by screws 546 (see FIGURE 23). Springs 548, disposed in recesses 542 between the rear ends of the locking members 524 and the rear wall of the recesses, bias locking members 524 forwardly through rectangularly sectioned apertures 550 formed in ballot access door 78, locking it in the closed position shown in FIGURE 24. Plastic buttons or buffers 552 (see FIGURE 24) fixed on the forward ends of locking members 524 prevent these members from damaging face plate 520.

The rectangularly sectioned intermediate portion 532 of shaft 526 also extends through a pair of upper crank arms 554 mounted adjacent crank arms 536. The apertures (not shown) in crank arms 554 are of similar rectangular configuration and thereby rotatively fix the crank arms to the shaft. Spacers 556 journalled on shaft 526 between lower crank arms 536 and standards 514 and 516 and a cylindrical spacer 558 journalled on shaft 526 between the upper crank arms 554 prevent lateral shifting of the crank arms 536 and 544.

The upper ends of upper crank arms 554 support a horizontally extending shaft 559 (see FIGURES 23 and 24) which extends through apertures 560 in the crank arms and is secured in place by retaining rings 562. Shaft 559 is operatively connected to the write-in unit input members 218 by locking straps 564, having chevron-shaped slots 565 through which the shaft extends, and code keys 566.

Referring now especially to FIGURES 22–24, locking straps 564 are thin, rectangularly sectioned, elongated members which are disposed in side-by-side relationship between a pair of rearwardly extending side wall members 568 and 570 fixed in laterally spaced apart relationship by a plate 571 (see FIGURES 22–24) to which they are fastened as by screws (not shown). Side wall members 568 and 570 are also fixed to standards 514 and 516 by Allen head screws or similar fasteners (not shown). Locking straps 564 are supported for forward and rearward movement by a horizontal mounting plate 572 which extends through elongated slots 574 formed in the locking straps. Referring now specifically to FIGURE 22, plate 572 is fixed in any appropriate manner to extension 576 of a pair of side wall extensions 576 and 578 which are disposed in recesses 579 formed in the rear ends of side wall members 568 and 570 flush with the opposite inner surfaces of the side wall members and which, as will become apparent later, also provide a support for interlock channel 508. Plate 572 extends through aligned slots 580 and 582 in the second side wall extension 578 and in side wall member 570, respectively.

Referring now to FIGURE 25, the movement of locking straps 564 is guided by a guide plate 583 secured to side wall members 568 and 570 by appropriate screws (not shown). The upper edges of locking straps 564 extend into parallel, laterally spaced apart slots 584 formed in the lower portion of guide plate 583.

Referring again to FIGURE 24, upwardly extending projections or lugs 585 formed adjacent the forward ends of the four central locking straps 564 extend through a slot 586 in plate 583 into downwardly opening slots 587 formed in the code keys 566.

Referring now to FIGURES 22 and 25, the four code keys 566, which rest on the upper surface of locking strap guide plate 583, are connected to the four input members 218 which, in the illustrated embodiment, are Bowden cables having wires 588 which extend through apertures 589 in the code keys and then are bent at right angles and extended through intersecting apertures 590 in the code keys to retain the wires in place.

Referring now especially to FIGURES 22, 24 and 25, code keys 566 are mounted for forward and rearward reciprocating movement under the influence of input members 218 by support members 591 through which the wires 588 of the input members 218 extend. Referring specifically to FIGURE 25, supports 591 are arranged in a staggered relationship spacing input members 218 apart both horizontally and vertically. Spacers 592, 594 and 596 are employed with the support members 591 to provide a substantially rectangular array which is fixed in place by a thrumb screw 598 threaded through an internally threaded aperture 600 in wall member 570 into engagement with spacer 596. Referring now to FIGURE 24, forward and rearward movement of support members 591 is prevented by a rectangularly sectioned lug 602 extending upwardly from the upper surface of locking strap mounting plate 583 into cooperating, rectangularly sectioned recesses 604 formed in the lower edges of the lower support members 591, and spacers 592, 594 and 596. Additional support is provided by a clamping plate 606 having a depending, rectangularly sectioned, laterally extending lug 608 which fits into similarly sectioned recesses 610 formed in the upper edges of the upper support members 591 and spacers 592 and 596. Clamping plate 606 is pressed against the upper surfaces of the members into which lug 608 extends by a pair of thumb screws 612 threaded into side wall members 568 and 570.

The door unlocking operation provided by the mechanism described in the preceding paragraph may best be understood by reference to FIGURES 24 and 28 which show the door in its locked and unlocked configurations, respectively. In the normal locked configuration, locking members 524 extend into the slots 550 in the ballot access door 78 and prevent the door from being raised. To write in a candidate's name, the voter depresses the voting button 80 of a write-in module 56 (see FIGURE 1). This causes the cable 588 of one of the input members 218 of the write-in unit to move forwardly (i.e., toward the face plate 510) together with the code key 566 to which it is attached and the associated locking strap 564. As locking strap 564 moves forward, shaft 559 is engaged by the rear end of the chevron-shaped slot 565 formed in the locking strap 564, rotating crank arms 554 and the shaft 526 to which they are fixed in a counterclockwise direction. Since the crank arms 536 are also fixed to shaft 526, they likewise rotate or pivot in a counterclockwise direction (i.e., away from the face plate 510 of the right-end unit). This motion is, in turn, transmitted to locking members 524, withdrawing them from slots 550 as is shown in FIGURE 28. The voter may then open the ballot access door 78, a handle 614 attached to ballot access door 78 by appropriate screws (not shown) being provided for this purpose. The voter may then proceed to write in the name of the desired candidate. To control and properly identify the write-in ballots, integral raised numbers (not shown) may be provided on the forward edges of the code keys 566 so that, when the code key is operated forwardly to the position shown in FIGURE 28, a code number will be embossed on the write-in ballot.

Ballot access door 78 may be spring loaded by appropriate springs (not shown) so that, when locking members 524 are withdrawn, it will be displaced slightly upward to prevent locking members 524 from reseating until the voter has written in a candidate's name and deliberately moved the ballot access door to the closed position. Preferably ballot access door 78 is connected to the write-in modules 56 by suitable linkages (which are not illustrated as they form no part of the present invention) actuated by door closing movement to restore the previously operated write-in module to the unvoted position. A label 615 may be cemented on face plate 510 to provide the voter with instructions for operating the write-in unit.

It is one of the features of the novel write-in unit 54 provided by the present invention that it prevents simultaneous input from more than one of the input members 218. The interlock channel 508 is provided for this purpose. Referring first to FIGURE 24, interlock channel 508 includes a pair of horizontal, vertically spaced apart plates 616 and 618 connected by a spacer 620 secured to the plates in any desired manner. At their forward ends, plates 616 and 618 are provided with rectangularly sectioned, laterally extending grooves 622 and 624 which open onto the opposite surfaces of the two plates. Interlock channel 508 is assembled onto the rear ends of side wall extensions 576 and 578 which have outwardly directed flanges 626 formed on the rear ends. The upper and lower edge portions of the flanges 626 are disposed in the notches 622 and 624 formed in the upper and lower interlock channel plates 616 and 618 and the forward edge portions 628 and 630 of plates 616 and 618 are received in notches 632 and 634 formed in the side wall extensions 576 and 578 immediately forward of flanges 626 (see FIGURE 24a). Interlock channel 508 is retained in place by a plurality (four in the illustrated embodiment) of pins 636 which extend through aligned apertures 638 in upper interlock plate 616 and 640 in lower interlock plates 618. The two outermost pins 636 also extend through apertures 642 in the flanges 626 of the side wall extensions 576 and 578 which are aligned with the apertures 638 and 640 in the interlock channel plates (see FIGURES 24a, 26, 27 and 29).

Figure 27:
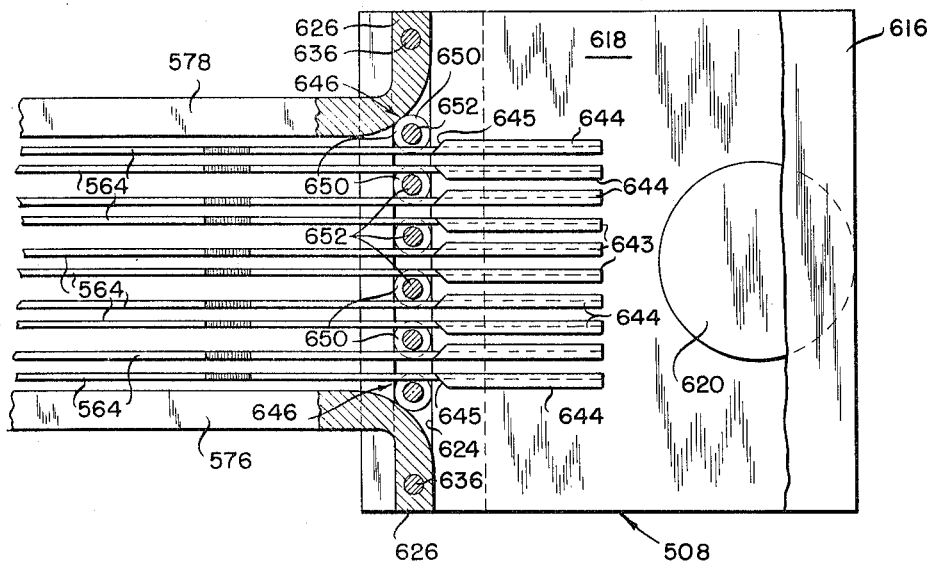
FIGURE 27 is a view taken substantially along line 27—27 of FIGURE 24 of the locking straps and rollers.

As is best shown in FIGURE 26, the rear end portions 643 of locking straps 564 have a channel-shaped configuration provided by flanges 644 having bevelled forward edges 645 (see FIGURE 27). The flanges 644 on the locking strap end portions are so disposed that the flanges on adjacent straps extend in opposite directions and (looking downwardly on the top of the locking straps As is best shown in FIGURE 26, the rear end portions 642 has, at its forward end, a substantially V-notched appearance. Disposed between adjacent locking straps 564 so that the bevelled forward edges 645 of flanges 644 are directed toward their peripheral limits, are a plurality of vertically extending cylindrical locking pins 646. As is best shown in FIGURE 24, locking pins 646 have enlarged diameter end portions 648 and 650 received in the laterally extending horizontal slots 622 and 624 formed in the upper and lower locking channel plates 616 and 618, respectively. Referring again to FIGURE 27, the intermediate portions 652 of the locking pins are of relatively smaller diameter and are engaged by adjacent locking straps 564 when the write-in unit 54 is in its normal inoperative position with ballot access door 78 locked closed.

Figure 29:
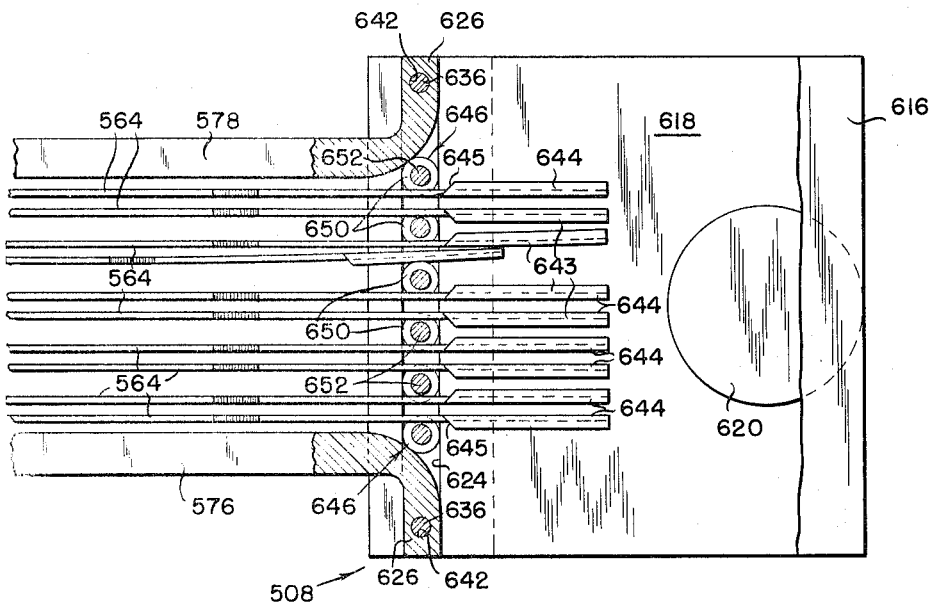
FIGURE 29 is a view similar to FIGURE 27 showing the configuration of the locking straps and rollers with one of the input members actuated.

It will be remembered that, when ballot access door 78 is unlocked by depressing the voting button 80 of a write-in module 56, one of the four locking straps 564 attached to the code keys 566 connected to input members 218 is pulled forwardly from the position shown in dotted lines in FIGURE 28 to the position shown in solid lines in the same figure, displacing the rear end portion 642 of that locking strap from the position shown in FIGURE 27 to the position shown in FIGURE 29. This wedges apart the remainder of the locking straps and the locking pins as shown in FIGURE 29, preventing another locking strap from being displaced until the displaced locking strap is restored to the original position shown in FIGURE 27. Since locking straps 564 are connected to the code keys 566, this arrangement is effective to prevent two code keys and therefore the input members 218 to which they are connected from being simultaneously displaced.

*Flexible ribbon interlock*

Referring now to FIGURE 30, the novel flexible ribbon interlock 57, which is one of the salient features of the present invention, consists generally of a long thin, flexible metallic ribbon 90, the ends of which are fixed in a pair of ribbon supply spools 92. Each of the spools 92 functions as a clamp to secure an end of ribbon 90 and as a one-way clutch to permit the slack in the ribbon to be varied.

Turning now to FIGURES 33 and 34, each supply spool 92 has a cylindrical, preferably plastic, enlarged diameter head 653 in which is formed a notch having a concave side wall 654 and a flat end wall 656. Extending outwardly from end wall 656 and secured therein in any appropriate manner is a pin 658. Pivotally mounted on pin 658 is a preferably plastic cam 660 having an extending convex cam surface 662 with the same configuration as notch side wall 654. As will be apparent from FIGURE 34, the end of the flexible metallic ribbon 90 is disposed between the cam surface 662 of cam 660 and notch side wall 654. A clamping force is exerted on the ribbon end by a clamping pin 664 (see FIGURE 35) having a head 666 threaded into an internally threaded aperture 668 in supply spool head 653 and an elongated shank 670 together with a spring 672 journalled on the clamping pin shank and extending between its head and an abutting surface 674 provided by a notch 676 cut in cam 660.

Referring now to FIGURES 32 and 36, supply spool head 653 is rotatably journalled on an elongated pin 678 which has an enlarged head 680 fixed in a recess 682 in the end wall 656 of the head and which extends through a bore 684 in the head. Fixed to pin 678 is a clutch member 686 provided with an aperture 687 through which pin 678 extends. Clutch member 686 is fixed to pin 678 by a setscrew 688 which is threaded into member 686 and engages a rectangularly sectioned intermediate portion 689 of the pin.

Referring now to FIGURE 32 and with continued reference to FIGURE 36, a tightly wound coil spring 690 is journalled on reduced diameter portions 692 and 694 of head member 653 and clutch member 686, respectively, and extends between annular shoulders 696 and 698 provided on the respective members by the reduced diameter portions. Spring 690 permits ribbon supply spool heads 653 to be rotated in a counterclockwise direction relative to clutch member 686, but prevents relative rotation in the opposite direction.

Turning next to FIGURES 30 and 36, in the illustrated programming of voting machine 48, each of the ribbon supply spools 92 is assembled to one of the blank modules 60. The reduced diameter portion 692 of the supply spool head 653 is supported by the rear wall 228 of the blank module 60 surrounding the aperture 226 through which the ribbon supply spool extends (see FIGURE 6). The forward end of the ribbon supply spool is supported by the ribbon supply spool clamp 224. As is best shown in FIGURE 36, the rectangular intermediate portion 689 of ribbon supply spool pin 678 extends through a like-configured aperture 700 in ribbon supply spool clamp 224, preventing rotation of the shaft and, therefore, the clutch member 686 fixed to it. Ribbon supply spool 92 is retained by the spring clip 234 which engages the terminal end portion 702 of shaft 678. Aligned slots 704 and 706 formed in supply spool head 653 and in cam 660, respectively, are adapted to receive a screwdriver-like tool for rotating supply spool head 653 to adjust the tension in the flexible metallic ribbon 90.

Referring now to FIGURE 30, the flexible metallic ribbon 90 is looped around the rollers 86 carried by the output members 84 of the voting modules 50 and the write-in modules 56 and around the idler rollers 88 carried by the voting modules 50, the write-in modules 56 and the blank modules 60.

In the following description of the operation of the flexible ribbon interlock 57, it will be assumed, as it was above, that the voter is to be permitted to vote for six candidates. To set this program into voting machine 48, the machine is first cleared by depressing the curtain opening lever 63 (see FIGURE 1) and then reset and unlocked by depressing the curtain closing lever 66, at which time the output members 84 of the voting modules 50 and the write-in modules 56 will be in the unvoted position. The vote buttons 70 of six voting modules 50 selected at random are then depressed, moving the six associated output members 84 to the voted position. The heads 653 of one or both of the ribbon supply spools 92 are then rotated until the flexible ribbon 90 is taut. If necessary (as when an office is not filled to the limit or excessive tension is developed), the ribbon supply spool 92 may be readily withdrawn. The desired amount of ribbon can then be unreeled, and the spool quickly reinserted.

The machine is then cleared by depressing the curtain opening lever 63, restoring the output members 84 of the voting modules 50 to the unvoted positions. Voting machine 48 is, at this point, programmed to limit the number of votes which may be cast by each voter to six and ribbon 98 is slack as shown in FIGURE 30. When a voter subsequently casts his ballot for the six candidates selected by him, the output members 84 of the six modules associated with those candidates are moved from the unvoted to the voted position. Thus in FIGURE 31 the output members 84 of the three voting modules 50 in each of the columns 62b and 62d have been moved to the voted position and the output members of the modules in column 62a and 62c are in the unvoted position. Displacement of each of the output members 84 from the unvoted to the voted position reduces the slack in flexible ribbon 90 by one-sixth. Consequently, when six modules have been voted, flexible ribbon 90 will become taut, preventing further voting buttons 70 of voting modules 50 or voting buttons 80 of write-in modules 56 from being depressed.

Numerous modifications may be made to the exemplary voting machine described above within the scope of the present invention. For example, in many jurisdictions party voting must be provided for as many as nine slates of candidates. Under such circumstances, voting machine 48 may be provided with a total of ten rails, nine party rails and a tenth rail for resetting the modules provided for independent candidates. Also the number of modules and the number of columns in which they are assembled may be varied as desired to, for example, provide a full 150 candidate machine.

The machine may likewise be modified to accommodate more than a single office as in the illustrated embodiment. In such case, a flexible ribbon interlock as described in above may be provided for each office. The ribbon supply spools 92 of the various ribbons may, in such case, be assembled into the office head modules 58 as well as the blank modules 60, as appropriate.

As a further modification, a force limiting or decoupling spring may be operatively connected between the voting buttons of the voting and write-in modules and the mechanism thereby operated to limit the force imposed on the operating mechanism and (through the output members) on the flexible metallic ribbon 90. Force limiters will prolong the life of the operating parts and will prevent attempts to cast more than the permissive number of votes by pressing a voting button with excessive force.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a flexible-program voting machine, a plurality of interchangeable voting modules having mechanical input members and mechanical output members; means operatively connecting said output members to said input members for translating movement of said output members in a linear direction transverse of the direction of movement of said input members when said input members are moved from unvoted to voted positions; a flexible interlock-ribbon operatively engaging the movable member of each module for limiting the number of voting module members moved to the voted position; and means for releasing said interlock-ribbon and returning members previously moved to the voted position to the unvoted position.

2. The voting machine defined in claim 27 wherein said groups are arranged in columns, each column being limited to voting members associated with candidates for a particular office to be filled, said office head member being superimposed on said column and including means for identifying the office to be filled.

3. The voting machine defined in claim 2 wherein said groups have equal numbers of members and at least one of the members in at least one of the groups is a blank member for equalizing the number of members in said groups.

4. The voting machine defined in claim 27 wherein said voting members are arranged in columns and including selectively operable means for operatively connecting the voting members in selected columns to respective actuators.

5. The voting machine defined in claim 27 wherein said actuators include horizontally reciprocable rails; and including a voter operated control for each of said actuators, said controls each including a cam mounted for pivotal movement about a vertical axis, means for pivoting said cam including a voter operated lever mounted for pivotal movement about a horizontal axis, and means for translating pivotal movement of said cam into horizontal movement of said rail to move the voting members of the associated group to the voted position.

6. The voting machine defined in claim 28 wherein said means for restoring said actuator to the disengaged position includes a bellcrank and a cam fixed to a vertical, rotatably mounted shaft; means operatively connecting said cam to said actuator; and means for rotating said bellcrank including a horizontal slide engaging one arm of said bellcrank and a voter operated lever mounted for movement about a horizontal axis for imparting horizontal movement to said slide.

7. The voting machine defined in claim 6 wherein said actuator includes an elongated, horizontally disposed member; said bellcrank is adjacent one end of said actuator; said first actuator moving means includes a second bellcrank pivotable about a vertical axis adjacent the opposite end of said actuator; a substantially rigid link pivoted to arms of said first and second bellcranks; means for pivoting said second bellcrank including a horizontally moveable slide operatively connected to said second bellcrank; and voter-operated lever means for moving said slide.

8. A voting module for a voting machine of modular construction, comprising: an output member movable from an unvoted position to a voted position; a voter-actuated input member; first means connected between said input member and said output member to move said output member to the voted position in response to voter actuation of said input member; and second means for cancelling said voter-actuated input by returning said output member to the unvoted position including a snap-acting toggle mechanism operatively connected to said first means between said input member and said output member.

9. The voting module defined in claim 8 including a second input member operatively connected to said toggle mechanism and selectively operable means for disconnecting said second input member and said toggle mechanism.

10. The voting module defined in claim 8 including a vote cancelling member operatively connected to said toggle mechanism for restoring said output member from the voted position to the unvoted position.

11. The voting machine defined in claim 30 wherein each of said modules includes a motion transmitting linkage operatively interposed between its input member and its output member and selectively operable means for disengaging said input member from said motion transmitting linkage without affecting the simultaneous output member operation of the remainder of said modules.

12. The voting machine defined in claim 30 wherein each of said modules includes a second input member for operating the output member of the module to the voted position without affecting output member movement of the remaining modules.

13. The voting machine defined in claim 30 wherein each module includes selectively actuable means for restoring its output member from the voted position to the unvoted position.

14. The voting machine defined in claim 30 including voter-operated control means for pivoting said input members to move the output members of said modules to the voted position, said control means being incorporated in a control unit independent of said modules and including a crank having its shaft fixed to one of said input members.

15. The voting machine defined in claim 14 wherein said control unit further includes a horizontally slidable rail and means for selectively operatively connecting said rail to the arm of said crank.

16. The voting machine of claim 15 including means for imparting unidirectional sliding movement to said rail comprising a voter-operated lever pivotable about a horizontal axis, a cam pivotable about a vertical axis, and means providing operative connections between said lever and said cam and between said cam and said rail.

17. The voting machine of claim 16 including a second voted-operated lever for sliding said rail in the opposite direction to restore the output members of said modules to the unvoted position.

18. In a flexible-program voting machine, a plurality of interchangeable voting modules each having an output member extending longitudinally from the module and movable transversely to the module from an unvoted position to a voted position and interlock means located exteriorly of the module adapted to operatively engage each output member for preventing more than a predetermined number of said output members to be moved to the voted position, said interlock means comprising a flexible ribbon engaging said output members and having a predetermined amount of slack with all of said output members in the unvoted position, movement of any of said output members to the voted position providing a predetermined reduction in said slack.

19. The voting machine defined in claim 18 including means for adjusting the slack in said ribbon.

20. The voting machine defined in claim 19 wherein said slack adjusting means comprises a supply reel having a ribbon clamp and a one-way clutch.

21. In a write-in unit for a voting machine of modular construction, a write-in door displaceable to provide access to a write-in ballot; means locking said door in a closed position; and a plurality of voter-operated input means for unlocking said door.

22. In a voting machine of modular construction, a write-in unit having a write-in door normally locked in a closed position and a plurality of input members each operable to unlock said door to permit access to a write-in ballot; a plurality of voting modules each having an input member and an output member operatively connected to one of the input members of said write-in unit; and means in said write-in unit preventing simultaneous actuation of two or more of said write-in unit input members.

23. The voting machine defined in claim 22 wherein said write-in door has at least one locking recess formed therein; and including a locking member having a locking projection, said member being movable from a first position wherein said locking projection is disposed in said recess; and means operatively connected to each of said write-in unit input members for withdrawing said projection from said recess.

24. The voting machine defined in claim 23 wherein said locking member withdrawing means includes a bellcrank having one arm operatively connected to said locking member and said write-in unit input members include elongated straps operatively connected to the other arm of said bellcrank.

25. The voting machine defined in claim 24 wherein said straps are disposed in side-by-side relationship and said means for preventing simultaneous input member actuation includes an interlock channel with the ends of said straps extending into said channel, wedges formed on said ends of said straps, and rollers between said wedges.

26. In a voting machine of assembled modular construction, a plurality of distinct voting modules each having an output member movable from an unvoted position to a voted position, alternatively employable first and second input means for moving the output member of each module to the voted position, the second input means of said modules being operatively interconnected upon assembly of said modules to permit operation of all of said output members to the voted position by actuation of one of said second input members; voter-operated means for actuating one of said second input members; voter-operated means for simultaneously restoring all of said output members to the unvoted position; and selectively operable means for disengaging selected voting module output members from said second input member actuating means without affecting the simultaneous output member restoring operation of said voter-operated restoring means.

27. In a voting machine, a plurality of interchangeable voting members including vote registering outputs arranged in groups; an actuator for moving the voting members in each group from an unvoted position to a voted position; each of said voting members including means for operatively interconnecting said voting members with said actuator, at least one of said groups including at least one office head member having no vote registering output, said last-named member including means for operatively connecting the actuator to the voting members in said group, and interlock means comprising a flexible metallic ribbon operatively engaging the output of each of said voting members, said interlock means preventing operation of more than one of said actuators.

28. In a voting machine, a plurality of interchangeable voting members including vote registering outputs arranged in groups; an actuator for moving the voting members in each group from an unvoted position to a voted position; a voter manipulated operator for each of said actuators; means for moving said actuators from a first position wherein said operators are operatively disengaged from said actuators to a second position wherein said actuators and said operators are operatively connected, each of said operators being effective to move the associated actuator to a third position wherein the associated voting members are moved to the voted position; means for restoring said actuators to said first position; and interlock means comprising a flexible metallic ribbon operatively engaging the output of each of said voting members, said interlock means preventing operation of more than one of said actuators.

29. In a voting machine, a plurality of interchangeable voting members including vote registering outputs arranged in columns; actuators comprising reciprocal rails for moving the voting members in each column from an unvoted position to a voted position, selectively operable means for operatively connecting the voting members in selected columns to their respective actuators; said selectively operable means each including a member connected to the column voting members in the associated column and mounted for pivotal movement about an axis normal to the axis of reciprocation of said rails and a slidable member including a detent selectively engageable with any one of said reciprocal rails for pivoting each of said pivotally mounted members; and interlock means comprising a flexible metallic ribbon operatively engaging the output of each of said voting members for preventing operation of more than one of said actuators.

30. In a voting machine of assembled modular construction, a vertical stack of interchangeable voting modules each having input members comprising aligned shafts pivotable about a vertical axis, the opposite ends of the shafts of adjoining modules being operatively engaged, whereby said input members pivot as a unit about said axis and an output member movable from an unvoted position to a voted position, said input members being inter-connected to enable simultaneously operation of all of said output members to the voted position by actuation of one of said input members.

References Cited by the Examiner
UNITED STATES PATENTS

| | | | |
|---|---|---|---|
| 550,277 | 11/1895 | Lambert | 74—520 |
| 693,039 | 2/1902 | Luellen | 235—55 |
| 963,103 | 7/1910 | Winslow | 235—54 |
| 1,043,292 | 11/1912 | Bawron | 235—54 |
| 1,044,799 | 11/1912 | McElroy | 235—54 |
| 1,080,444 | 12/1913 | Henning | 235—55 |
| 1,524,607 | 1/1925 | Williams | 235—91 |
| 2,019,125 | 10/1935 | Feavyear et al. | 235—91 |
| 2,115,849 | 5/1938 | Gustavson | 235—55 |
| 2,191,086 | 2/1940 | Shoup | 235—55 |
| 2,903,165 | 9/1959 | Hanson et al. | 74—520 |

LEO SMILOW, *Primary Examiner.*